United States Patent
Caumartin et al.

(10) Patent No.: US 11,320,002 B2
(45) Date of Patent: May 3, 2022

(54) CLUTCH MECHANISM COMPRISING TWO ASSEMBLIES SEPARATED BY A DEVICE FOR ADJUSTING AN AXIAL DISTANCE

(71) Applicant: VALEO EMBRAYAGES, Amiens (FR)

(72) Inventors: Laurent Caumartin, Amiens (FR); Rabah Arhab, Amiens (FR); Herve Ribot, Amiens (FR); David Delplace, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 16/618,286

(22) PCT Filed: May 24, 2018

(86) PCT No.: PCT/EP2018/063730
§ 371 (c)(1),
(2) Date: Nov. 29, 2019

(87) PCT Pub. No.: WO2018/219791
PCT Pub. Date: Dec. 6, 2018

(65) Prior Publication Data
US 2020/0149596 A1   May 14, 2020

(30) Foreign Application Priority Data

May 31, 2017   (FR) ..................... 17 54840

(51) Int. Cl.
*F16D 21/06*   (2006.01)
*F16D 13/52*   (2006.01)
(Continued)

(52) U.S. Cl.
CPC ............. *F16D 21/06* (2013.01); *F16D 13/52* (2013.01); *F16D 13/75* (2013.01); *F16D 2021/0692* (2013.01); *F16D 2250/0084* (2013.01)

(58) Field of Classification Search
CPC .......... F16D 21/06; F16D 13/52; F16D 13/75; F16D 2021/0692; F16D 2250/0084;
(Continued)

(56) References Cited

U.S. PATENT DOCUMENTS 3,023,640 A * 3/1962 Schou ..................... F16H 47/08
475/70
3,566,707 A * 3/1971 Schulz ..................... F16H 3/00
74/377

(Continued)

FOREIGN PATENT DOCUMENTS

CN   101270785 A   9/2008
CN   103062360 A   4/2013
(Continued)

OTHER PUBLICATIONS

Machine language translation of DE102013219390.*
(Continued)

*Primary Examiner* — Mark A Manley
(74) *Attorney, Agent, or Firm* — Oblon, McClelland, Maier & Neustadt, L.L.P.

(57) ABSTRACT

A clutch mechanism that is configured to be driven in rotation about an axis and includes two assemblies, each assembly including at least an outer disc carrier externally delimiting a cavity, a clutch comprising a stack of coupling discs, and friction discs, the stack being housed in the cavity and configured to be driven in rotation about the axis, a reaction member configured to allow compression of the coupling discs against the friction discs in an engaged position of the clutch, the clutch mechanism comprising at least one device for assembling the two assemblies, the clutch mechanism including at least one device for adjusting an axial distance between the two clutches.

18 Claims, 10 Drawing Sheets

(51) Int. Cl.
  *F16D 13/75*   (2006.01)
  *F16D 25/10*   (2006.01)
  *F16D 25/08*   (2006.01)

(58) Field of Classification Search
  CPC ............. F16D 2021/0607; F16D 25/10; F16D 2021/0661; F16D 25/082
  See application file for complete search history.

(56) References Cited

U.S. PATENT DOCUMENTS

| | | | | |
|---|---|---|---|---|
| 2007/0240961 | A1* | 10/2007 | Gremplini | F16D 21/06 192/48.606 |
| 2011/0114436 | A1* | 5/2011 | Noehl | F16D 25/123 192/48.601 |
| 2013/0056323 | A1* | 3/2013 | Jakob-Bodenhagen | F16D 21/06 192/48.603 |
| 2016/0084322 | A1* | 3/2016 | Arhab | F16D 25/0638 192/70.12 |

FOREIGN PATENT DOCUMENTS

| | | |
|---|---|---|
| CN | 103375502 A | 10/2013 |
| CN | 103883638 A | 6/2014 |
| CN | 104956107 A | 9/2015 |
| DE | 10 2007 027 118 A1 | 1/2009 |
| DE | 2013219390 * | 4/2014 |
| DE | 10 2015 213 125 A1 | 1/2017 |
| EP | 3 133 308 A1 | 2/2017 |
| FR | 2 814 516 A1 | 3/2002 |
| WO | WO 2015/124154 A2 | 8/2015 |
| WO | WO 2015/124154 A3 | 10/2015 |
| WO | WO 2017/076752 A1 | 5/2017 |

OTHER PUBLICATIONS

Written Opinion dated Sep. 18, 2018 in PCT/EP2018/063730 (with English language translation), 12 pages.
Combined Chinese Office Action and Search Report dated Dec. 3, 2020 in Patent Application No. 201880047165.0 (with English translation of Category of Cited Documents), 8 pages.
International Search Report dated Sep. 18, 2018 in corresponding PCT Application No. PCT/EP2018/063730 filed on May 24, 2018, 2 pages.

* cited by examiner

CLUTCH MECHANISM COMPRISING TWO ASSEMBLIES SEPARATED BY A DEVICE FOR ADJUSTING AN AXIAL DISTANCE

The field of the present invention is that of transmissions for motor vehicles. The invention relates more specifically to the field of dual-clutch mechanisms for motor vehicles.

Such dual-clutch mechanisms, generally of the multidisk type, are known from the prior art. Such mechanisms are intended to be mounted on a gearbox of a motor vehicle so as to be coupled in terms of rotation about an axis. This type of dual-clutch mechanism generally comprises a first and a second clutch respectively associated with a first and a second shaft. The first and second clutches of these dual-clutch mechanisms can be configured to be positioned in an axial configuration, namely a configuration in which the clutches and, particularly, the disks of the first and second clutches, are positioned relative to one another about the axis and according to a plane of symmetry perpendicular to the axis.

Document DE10 2012 008 779 describes such a dual-clutch mechanism of the wet clutch type, namely supplied with pressure by a hydraulic fluid such as oil, that lubricates and cools the dual-clutch mechanism notably when the respective disks of the clutches are coupled in a clutch-engaged position.

In particular, that document describes a dual-clutch mechanism configured to be driven in rotation about an axis and contained in an external disk support delimiting a clutch chamber in which two friction clutches are positioned symmetrically with respect to one another. The friction clutches of this dual-clutch mechanism, and more particularly their respective friction disks, are therefore positioned in an axial configuration as described above. For each clutch, the friction disks are positioned between a pressure plate and a reaction thrust bearing. Each of the reaction thrust bearings therefore faces the other, so that they are axially distant from one another in order not to be in axial contact.

A connecting ring rigidly secured to the disk support is associated with each clutch so as to keep the connecting thrust bearing with which it collaborates in a determined axial position. The connecting ring is positioned at an outer radial end of the reaction thrust bearing of each clutch. The connecting rings of the clutches also face one another and are axially distant from one another. The reaction thrust bearings are therefore configured not to be in contact with one another.

This solution displays numerous disadvantages. More particularly, a first disadvantage has to do with the assembling of such a clutch mechanism which requires complex assembly in order to allow both an axial clearance internal to each clutch, or intra-clutch clearance, to be set, and an axial clearance between the two clutches, or inter-clutch clearance, to be set. Specifically, the assembly of such a clutch mechanism entails, for each clutch, the friction elements, of the reaction thrust bearing and of the pressure plate, to be successively stacked. Once assembled, the operation of clutch mechanism is tested. In the clutch-disengaged position of each clutch, the internal axial clearance of the friction disks and the associated reaction plate is measured. When it is found that the axial clearance internal to each clutch or that the axial clearance between the two clutches does not correspond to the desired configuration, the clutch mechanism has to be disassembled again in order to make the appropriate adjustments. These adjustments are chiefly connected with the axial thickness of an axial adjustment spacer which is generally positioned between the first shaft and the second shaft of the clutch mechanism.

Aside from the complex assembly, such a mechanism does not allow flexibility in mass production, particularly when the clutches are not transmitting the same torque. Specifically, when the first clutch and the second clutch do not comprise the same number of friction elements, it is then necessary to use a different disk support suited to that configuration.

It is an objective of the present to alleviate at least one of the aforementioned disadvantages and to propose a clutch mechanism that allows simplified assembly while at the same time allowing one clutch to be operated without disturbing the other clutch.

To this end, one subject of the invention is a clutch mechanism configured to be driven in rotation about an axis and comprising two assemblies, each assembly comprising at least:
- an outer disk carrier delimiting on the outside a cavity,
- a clutch comprising a stack of coupling disks and of friction disks, the stack being housed in the cavity and configured to be driven in rotation about the axis,
- a reaction member of the outer disk carrier configured to allow the coupling disks to be compressed against the friction disks in a clutch-engaged position of the clutch, the clutch mechanism comprising at least one assembly device for assembling the two assemblies with one another, the clutch mechanism comprising at least one adjusting device for setting an axial distance separating the two clutches.

By virtue of these features it is possible to create a two-part clutch mechanism in which the clearance between the two clutches, or inter-clutch clearance, can be set via the device for adjusting the axial distance separating the two clutches. This configuration additionally makes it possible to avoid generating dependency between the clutches when they are operated.

The clutch mechanism according to the invention may advantageously comprise at least one of the refinements below, the technical features that form these refinements being able to be considered alone or in combination:
- the outer disk carriers of the first and second clutches are distinct;
- the adjusting device makes it possible to set an internal axial clearance for each clutch;
- advantageously, the adjusting device makes it possible to set the internal axial clearance between the coupling disks and the friction disks for each clutch;
- the adjusting device is positioned between the two outer disk carriers;
- the reaction members are positioned axially between the clutches of the two assemblies;
- the adjusting device is attached to the outer disk carriers of the clutch mechanism;
- the adjusting device is one of the components of the assembly device;
- each of the outer disk carriers of the assemblies comprises at least a first extension extending radially outward beyond a peripheral edge of the corresponding outer disk carrier, the adjusting device being positioned between the two first extensions;
- advantageously, at least the first extension of the outer disk carriers is positioned at one axial end of the peripheral edge of the corresponding outer disk carrier;

advantageously, at least one of the outer disk carriers comprises a plurality of first extensions angularly distributed about the peripheral edge of the corresponding outer disk carrier;

advantageously, each of the outer disk carriers comprises a plurality of first extensions angularly distributed about the peripheral edge of the corresponding outer disk carrier;

advantageously, at least one of the first extensions extends in a plane perpendicular to the axis over an angle of less than 45°;

advantageously, at least the first extension of at least one of the outer disk carriers forms a circular contour which extends around the peripheral edge of the corresponding outer disk carrier;

advantageously, at least the first extension coincides with the peripheral edge;

advantageously, at least the first extension is attached to the peripheral edge of the outer disk carrier of at least one assembly of the clutch mechanism;

advantageously, at least the first extension is formed integrally with the peripheral edge of the outer disk carrier of at least one assembly of the clutch mechanism;

advantageously, the reaction member of at least one assembly is fully housed in said cavity;

advantageously, the reaction member of at least one assembly is fully housed in said cavity some distance from the peripheral edge of the outer disk carrier of the corresponding assembly;

the adjusting device is formed by a spacer;

the spacer is attached to the outer disk carriers;

the spacer keeps at least one of the reaction members bearing against the corresponding clutch;

advantageously, the spacer keeps each of the reaction members bearing against the corresponding clutch;

advantageously, the spacer has a T-shaped cross section;
advantageously, the spacer has a Y-shaped cross section;
advantageously, the spacer has an L-shaped cross section;
advantageously, the spacer has an I-shaped cross section;

the spacer is of circular shape with respect to the axis and comprises an annular part with the axis as its center;

the spacer is formed of a plurality of curved sectors spaced apart from one another;

the spacer comprises at least one radial projection with respect to the axis providing bearing pressure against at least the first extension of each of the outer disk carriers;

the radial projection extends radially chiefly to the outside of the cavity, namely beyond the peripheral edge of the corresponding outer disk carrier;

the radial projection extends from the annular part radially with respect to the axis;

the radial projection bears against at least one peripheral edge of the outer disk carrier;

the radial projection bears against the peripheral edges of the outer disk carriers;

the radial projection bears against at least the first extension of the corresponding outer disk carrier;

the radial projection bears against the first extension of each outer disk carrier;

the radial projection makes it possible to adjust the axial distance separating the two clutches;

the thickness, measured axially, of the radial projection makes it possible to set the axial distance separating the two clutches;

the spacer comprises at least a first axial projection providing bearing pressure against one of the reaction members;

the first axial projection makes it possible to set the internal axial clearance for the clutch associated with the corresponding reaction member;

the thickness, measured axially, of the first axial projection makes it possible to set the internal axial clearance for the clutch associated with the corresponding reaction member;

advantageously, the first axial projection extends from the annular part axially in the direction of the clutch of said corresponding assembly;

advantageously, the first axial projection extends from the annular part axially and radially in the direction of the clutch of said corresponding assembly;

the spacer comprises at least a second axial projection providing bearing pressure against the other reaction member, the first axial projection being distinct from the second axial projection;

the second axial projection makes it possible to set the internal axial clearance for the clutch associated with the corresponding reaction member;

the thickness, measured axially, of the second axial projection makes it possible to set the internal axial clearance for the clutch associated with the corresponding reaction member;

advantageously, the second axial projection extends from the annular part axially in the direction of the clutch of said corresponding assembly;

advantageously, the second axial projection extends from the annular part axially and radially in the direction of the clutch of said corresponding assembly;

the first axial projection and the second axial projection have identical axial dimensions;

the first axial projection and the second axial projection have different axial dimensions;

advantageously, the first axial projection, the second axial projection and the spacer are integrally formed in the same material;

advantageously, the first axial projection and the second axial projection are attached to the spacer;

advantageously, the spacer comprises a rib on an internal contour of the annular part;

advantageously, the rib makes it possible to avoid generating dependency between the clutches when they are operated;

advantageously, the rib is of V-shaped cross section;

advantageously, the rib exhibits symmetry of revolution about the axis;

the radial projection comprises at least one assembly opening for assembling the two assemblies with one another;

the adjusting device is formed by at least one reaction member of the assemblies;

advantageously, the adjusting device is formed by each of the reaction members of the assemblies;

the reaction member is attached to the outer disk carrier;

the adjusting device comprises a radially outer part of the reaction member extending radially chiefly to the outside of the cavity, namely beyond the peripheral edge of the corresponding outer disk carrier;

advantageously, the adjusting device comprises a radially outer part of each reaction member extending radially chiefly to the outside of the cavity, namely beyond the peripheral edge of the corresponding outer disk carrier;

advantageously, the radially outer part of the reaction member extends radially with respect to the axis;

the radially outer part of the reaction member of the corresponding assembly bears against a radially outer part of the reaction member of the other assembly;

advantageously, the radially outer part of the reaction member of at least one assembly bears axially against the radially outer part of the reaction member of the other assembly;

in other words, when the two assemblies are in the assembled state, the two reaction members bear against one another via their radially outer parts;

at least the radially outer part of the reaction member allows the setting of the axial distance separating the two clutches;

advantageously, the radially outer parts of the reaction members allow the adjustment of the axial distance separating the two clutches;

advantageously, the radially outer part of each reaction member is of a thickness, measured axially, that differs one from the other;

advantageously, the radially outer part of each reaction member is of a thickness, measured axially, that is identical one with the other;

a thickness, measured axially, of the radially outer part of the reaction member determines the axial distance separating the two clutches;

advantageously, a thickness, measured axially, of the radially outer part of each reaction member determines the axial distance separating the two clutches;

the adjusting device comprises a radially inner part of the reaction member, which part is situated inside the cavity, namely on the inside with respect to the peripheral edge of the corresponding outer disk carrier;

advantageously, the adjusting device comprises a radially inner part of each reaction member, which part is situated inside the cavity, namely on the inside with respect to the peripheral edge of the corresponding outer disk carrier;

advantageously, the radially inner part of the reaction member extends radially with respect to the axis;

advantageously, the radially inner part of the reaction member extends axially and radially with respect to the axis;

advantageously, the radially inner part of the member makes it possible to set an internal axial clearance for the corresponding clutch;

an inner radial edge of the radially inner part of the reaction member bearing against the corresponding clutch is axially offset with respect to an outer radial edge of the radially outer part of the same reaction member bearing against the corresponding outer disk carrier;

a width of the radially inner part of the reaction member, measured axially between the inner radial edge bearing against the corresponding clutch and the outer radial edge bearing against the corresponding outer disk carrier, determines the internal axial clearance for the corresponding clutch;

advantageously, a width of the radially inner part of each reaction member, measured axially between the inner radial edge bearing against the corresponding clutch and the outer radial edge bearing against the corresponding outer disk carrier, determines the internal axial clearance for each clutch;

advantageously, the outer radial edge of the radially outer part bears against the first extension of the corresponding outer disk carrier;

advantageously, the reaction member of at least one assembly formed by the radially outer part and the radially inner part has an S-shaped cross section;

advantageously, the reaction member of at least one assembly has an I-shaped cross section;

advantageously, the reaction member of at least one assembly has an L-shaped cross section;

advantageously, the reaction member of at least one assembly has a Y-shaped cross section;

advantageously, the outer radial edge of the radially outer part of at least one reaction member comprises first angular sectors extending radially outward, the first angular sectors being angularly distributed about the axis, each first angular sector of the corresponding reaction member collaborating with at least the first extension of the corresponding outer disk carrier;

advantageously, the first angular sectors extend radially outward with respect to the axis;

advantageously, the radially outer part of at least one reaction member forms a circular contour which extends peripherally about the axis;

a non-zero axial separation is formed between a radially inner part of a reaction member of one assembly and a radially inner part of the reaction members of the other assembly;

advantageously, the non-zero axial separation is measured axially;

advantageously, the radially outer part of the reaction member of each assembly respectively bears axially against the peripheral edge of its corresponding disk carrier;

advantageously, at least a first angular sector of the radially outer part of the reaction member of at least one assembly is designed to collaborate with at least the first extension of the corresponding outer disk carrier, so as to assemble the reaction member with its corresponding outer disk carrier;

advantageously, at least the first angular sector of the radially outer part of the reaction member of at least one assembly bears axially against at least the first extension of the outer disk carrier of the corresponding assembly;

advantageously, the radially outer part of the reaction member of each assembly comprises second angular sectors distributed angularly about the axis and which extend radially outward from the outer radial edge, each second angular sector of the reaction member of one assembly collaborating with a second angular sector of the reaction member of the other assembly;

advantageously, at least one second angular sector of the radially outer part of the reaction member of one assembly is designed to collaborate with at least one second angular sector of the radially outer part of the reaction member of the other assembly with a view to assembling the assemblies with one another, the assembly device comprising at least the corresponding second angular sector of the radially outer part of the reaction member of each assembly;

advantageously, the second angular sectors of the radially outer part of the reaction member of one assembly bear axially against the second angular sectors of the radially outer part of the reaction member of the other assembly;

advantageously, the radially outer part of the reaction member of at least one assembly is designed to collaborate both with the radially outer part of the reaction member of the other assembly and with at least the first extension of the outer disk carrier of each assembly;

advantageously, at least a first angular sector of the radially outer part of the reaction member of at least one assembly is designed to collaborate both with at least one first angular sector of the radially outer part of the reaction member of the other assembly and with at least the first extension of the outer disk carrier of each assembly with a view to assembling the assemblies with one another, the assembly device comprising at least the first corresponding angular sector of the radially outer part of the reaction member of each assembly and at least the corresponding first extension of the outer disk carrier of each assembly;

advantageously, the outer disk carrier of at least one assembly comprises at least a second extension extending beyond the peripheral edge of the outer disk carrier of the corresponding assembly, at least the second extension comprising a first portion and a second portion which are arranged with a view to assembling the assemblies with one another, the assembly device comprising at least the corresponding second extension;

advantageously, the first portion extends axially in the opposite direction beyond the peripheral edge of the corresponding outer disk carrier and the second portion extends radially outward beyond the peripheral edge of the corresponding outer disk carrier;

advantageously, the second portion succeeds the first portion; advantageously, the first portion and the second portion are delimited by the one same joining fold;

advantageously, the first portion and the second portion together form an L-shaped cross section;

advantageously, the peripheral edge of the corresponding outer disk carrier and the first portion are configured to accept, correspondingly, the outer radial edge of the radially outer part of the corresponding reaction member;

advantageously, each of the outer disk carriers comprises at least a second extension, at least the second extension of an outer disk carrier being designed to collaborate with at least the second extension of the other outer disk carrier, the assembly device comprising the corresponding second extensions;

advantageously, the radially outer part of the reaction member of at least one assembly comprises second angular sectors distributed angularly about the axis and which extend radially outward from the outer radial edge and at least the second extension of an outer disk carrier of one assembly is designed to collaborate with at least a second angular sector of the radially outer part of the reaction member of the other assembly, the assembly device comprising at least the corresponding second extension and at least the corresponding second angular sector;

advantageously, the radially outer part of the corresponding reaction member bears radially via its outer radial edge against the first portion of at least the second extension.

According to various features associated with the assembly device and which can be considered independently from one another or in combination:

advantageously, the assembly device comprises at least one assembly rivet or assembly screw configured to pass through an assembly hole formed in at least the first extension of each outer disk carrier and through the assembly opening of the radial projection of the spacer;

advantageously, the assembly device assembles the two assemblies with one another via the outer disk carrier of each assembly;

advantageously, the assembly device comprises at least the corresponding first extension of each outer disk carrier;

advantageously, the assembly device comprises at least one assembly rivet or assembly screw configured to pass through an assembly hole formed in a first extension of at least one outer disk carrier;

advantageously, the assembly device comprises at least one assembly rivet or assembly screw configured to pass through an assembly hole formed in at least the first extension of one outer disk carrier and through an assembly hole formed in at least the first extension of the other outer disk carrier;

advantageously, the assembly device comprises a plurality of assembly rivets and/or assembly screws each configured to pass through an assembly hole formed in a first extension of one outer disk carrier and through an assembly hole formed in at least the first extension of the other outer disk carrier;

advantageously, the assembly device comprises at least one assembly rivet or assembly screw configured to pass through an assembly orifice formed in at least a first angular sector of the radially outer part of the reaction member of one assembly and through an assembly hole formed in a first extension of the outer disk carrier of the same assembly;

advantageously, the assembly device comprises at least one assembly rivet or assembly screw configured to pass through an assembly orifice formed in at least a second angular sector of the radially outer part of the reaction member of one assembly and through an assembly orifice formed in at least a second angular sector of the radially outer part of the reaction member of the other assembly;

advantageously, the assembly device comprises at least one assembly rivet or assembly screw configured to pass through an assembly orifice formed in at least a first angular sector of the radially outer part of the reaction member of one assembly and through an assembly orifice formed in at least a first angular sector of the radially outer part of the reaction member of the other assembly;

advantageously, the assembly device comprises at least one assembly rivet or assembly screw configured to pass through an assembly orifice formed in at least a first angular sector of the radially outer part of the reaction member of one assembly and through an assembly hole formed in at least a first extension of the outer disk carrier of the corresponding assembly;

advantageously, the assembly device comprises at least one assembly rivet or assembly screw configured to pass through an assembly orifice formed in a first angular sector of the radially outer part of the reaction member of each assembly and through an assembly hole formed in at least a first extension of the outer disk carrier of each assembly;

advantageously, the assembly device comprises at least one assembly rivet or assembly screw configured to pass through an assembly opening formed in the second portion of at least a second extension of an outer disk carrier of one assembly and through an assembly opening formed in the second portion of at least a second extension of an outer disk carrier of the other assembly;

advantageously, the assembly device comprises at least one assembly rivet or assembly screw configured to pass through an assembly opening formed in the second portion of at least a second extension of an outer disk carrier of one assembly and through an assembly orifice formed in at least a second angular sector of the radially outer part of the reaction member of the other assembly;

advantageously, the assembly device comprises a plurality of rivets;

advantageously, the outer disk carriers of each assembly may have identical axial dimensions;

advantageously, the outer disk carriers of each assembly may have identical shapes;

advantageously, the clutch mechanism is a clutch mechanism of the wet dual-clutch type;

advantageously, the clutches are wet clutches and are positioned axially one next to the other.

The invention also relates to a transmission for a motor vehicle comprising a clutch mechanism as described hereinabove.

Advantageously, the transmission comprises at least one gearbox and a clutch bellhousing delimiting a volume in which the clutch mechanism at least partially extends.

The invention also relates to a method for assembling a clutch mechanism comprising the following steps consisting in:

in a first placement step, positioning the assemblies relative to one another in such a way that one of the outer disk carriers faces the other outer disk carrier;

in a second placement step, positioning the adjusting device between the two assemblies;

in an assembly step, fixing the assemblies to one another by means of the adjusting device and using the assembly device.

According to one alternative form of the invention, the method according to the invention comprises a step of selecting the adjusting device.

Further features, details and advantages of the invention will become more clearly apparent from reading the following description given by way of indication hereinafter with reference to the drawings in which.

Figure 7:
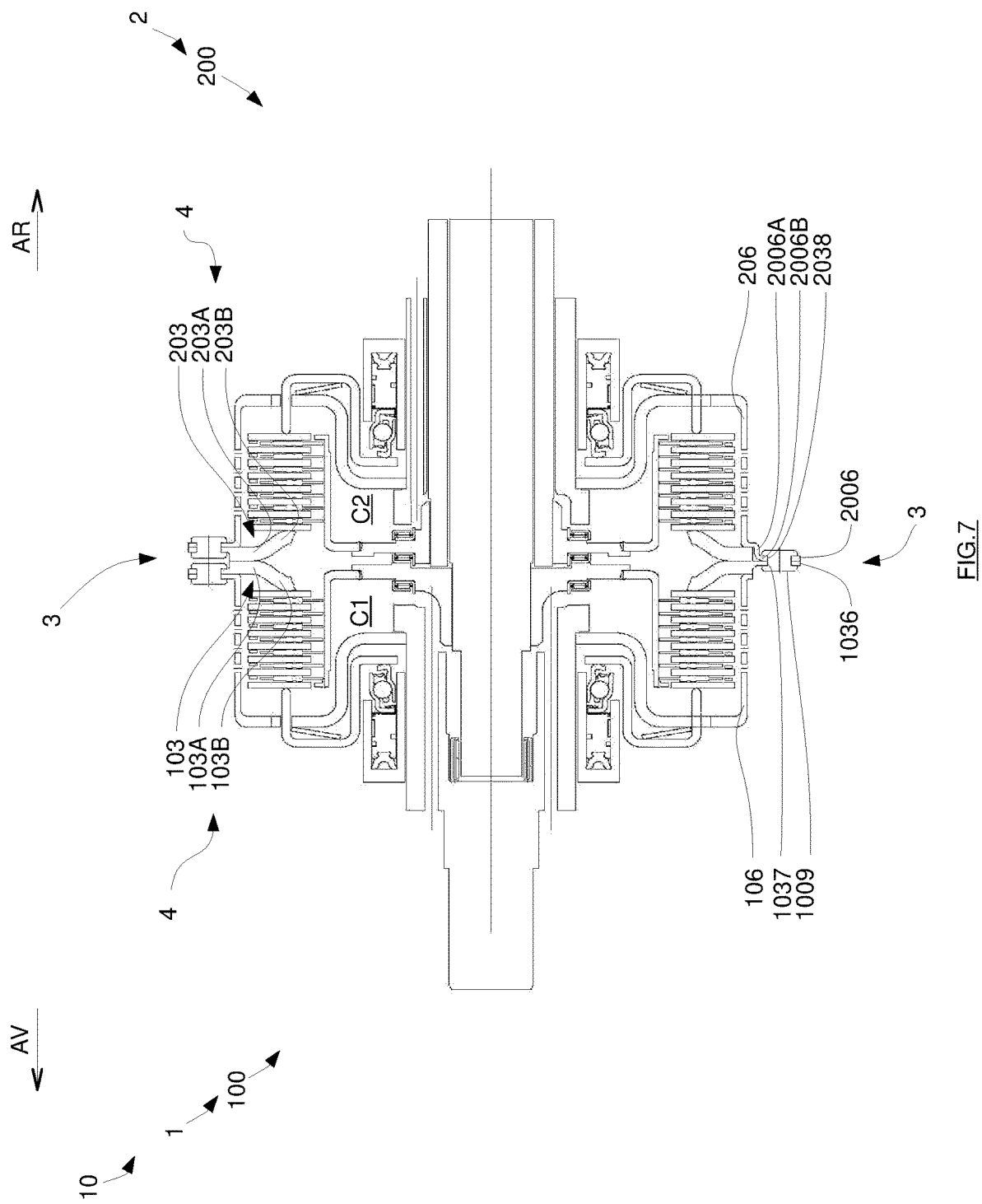
Figure 8:
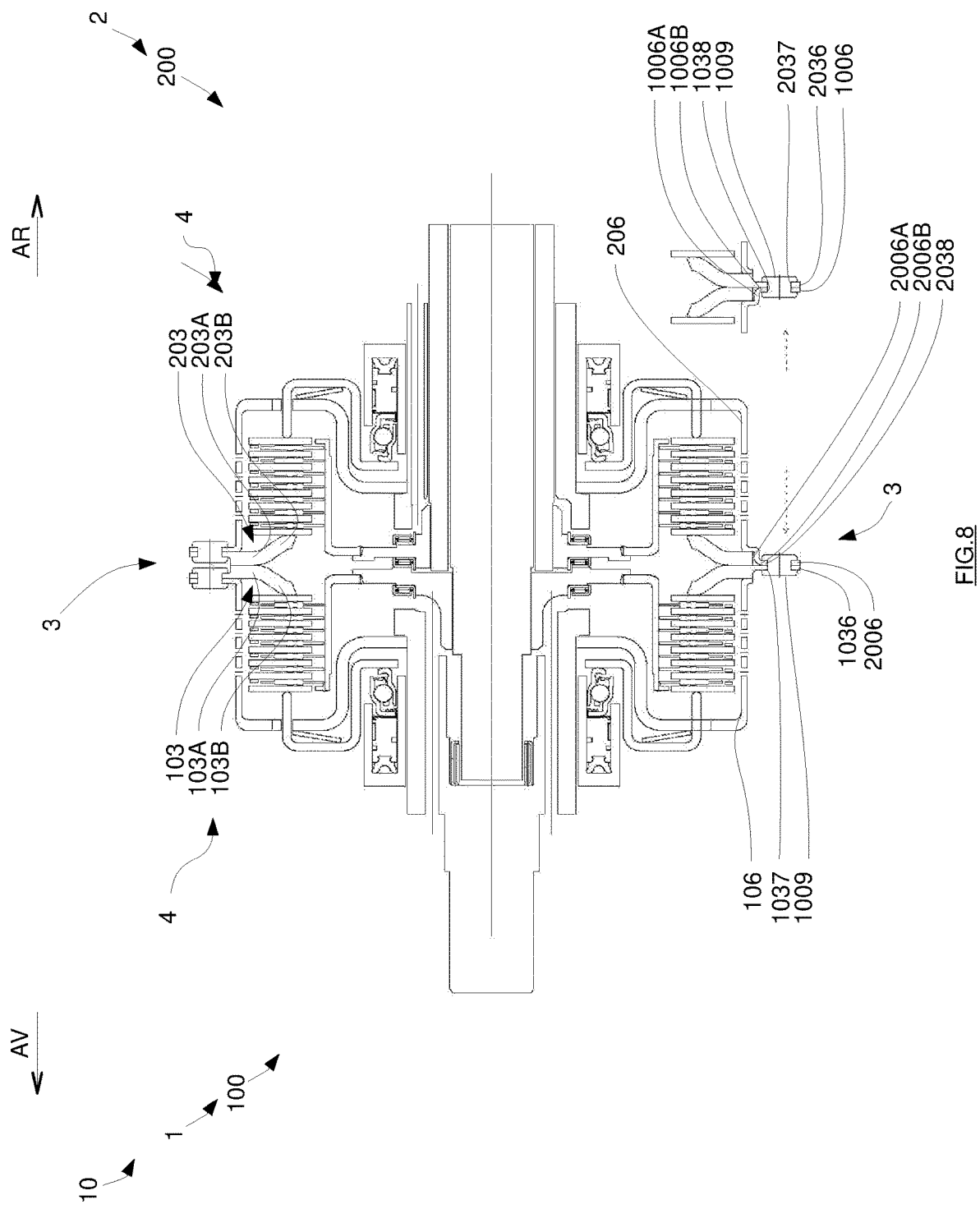
Figure 9:
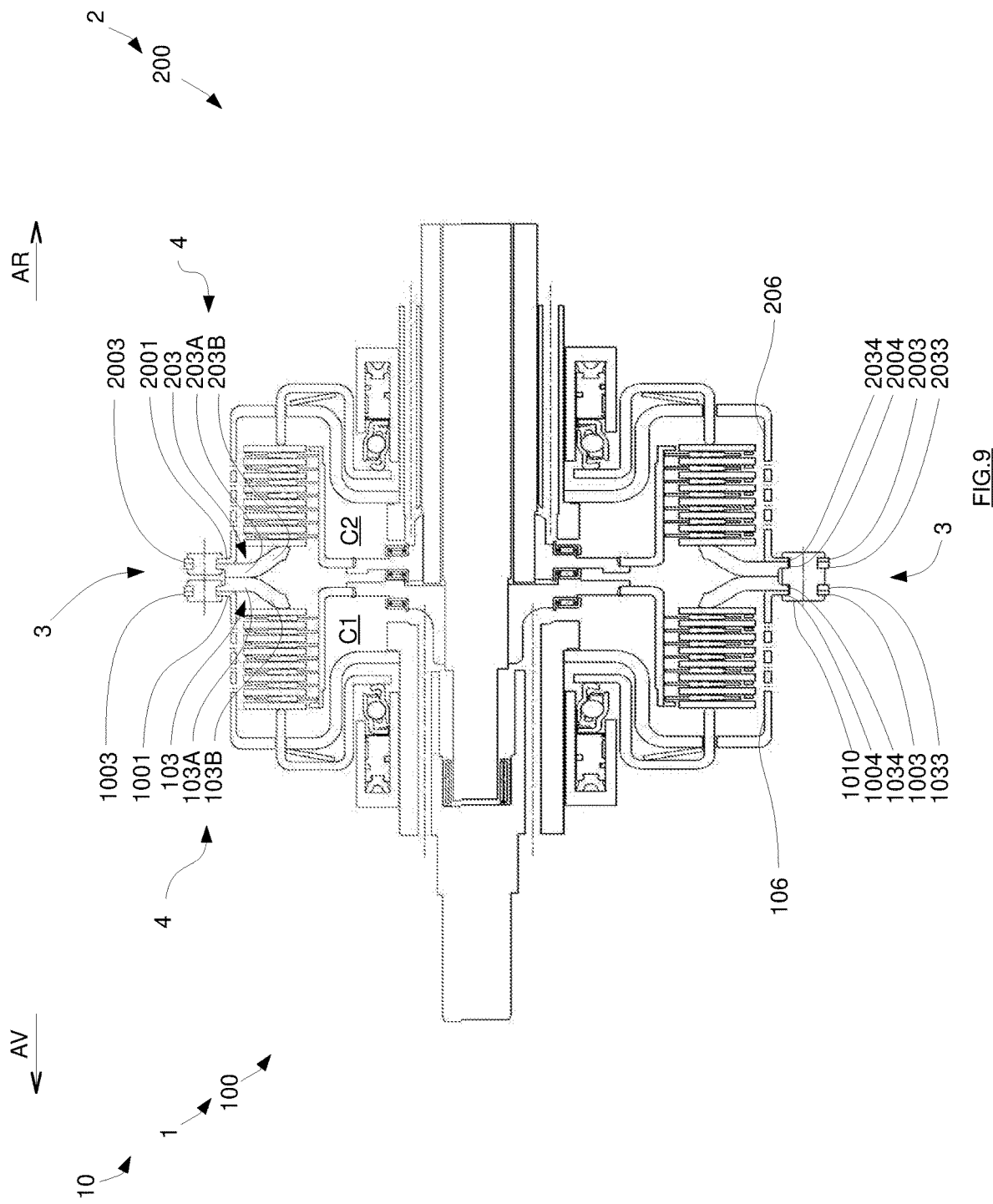

FIG. 7 illustrates a view in section of a fourth embodiment in which the reaction members form the adjusting device and are assembled with their corresponding disk carrier by first angular sectors in register with the first extensions of the disk carriers and in which the disk carrier of one assembly is assembled with the reaction member of the other assembly by, respectively, second extensions of the disk carrier of the corresponding assembly and second angular sectors of the reaction member of the corresponding assembly;

FIG. 8 illustrates a perspective view of an alternative form of the fourth embodiment of FIG. 7, in which each disk carrier of one assembly is assembled with the reaction member of the other assembly by, respectively, second extensions of the disk carrier of the corresponding assembly and second angular sectors of the reaction member of the corresponding assembly;

FIG. 9 illustrates a view in section of a fifth embodiment in which the reaction members form the adjusting device of each assembly, and are assembled with one another, and the disk carriers and the reaction members of each assembly are assembled with those of the other assembly by, respectively, first extensions of the disk carrier of the corresponding assembly and first angular sectors of the reaction member of the corresponding assembly.

In the remainder of the description and in the claims, the following terms will be used nonlimitingly and in order to facilitate understanding:

"front" AV or "rear" AR according to the direction with respect to an axial orientation determined by the main axis O of rotation of the transmission system, the "rear" referring to the part situated to the right in the figures, on the transmission side, and the "front" referring to the part on the left in the figures, on the engine side; and "inner/internal" or "outer/external" with respect to the axis O and in a radial orientation, orthogonal to the said axial orientation, "inner" referring to a part proximal to the axis O and "outer" referring to a part distal from the axis O;

"corresponding" to associate the object of an assembly or the assembly with which this term is connected to another object from the same assembly;

"intra-clutch" to define an axial clearance internal to a clutch;

"inter-clutch" to define an axial distance separating the two clutches.

Figure 1:
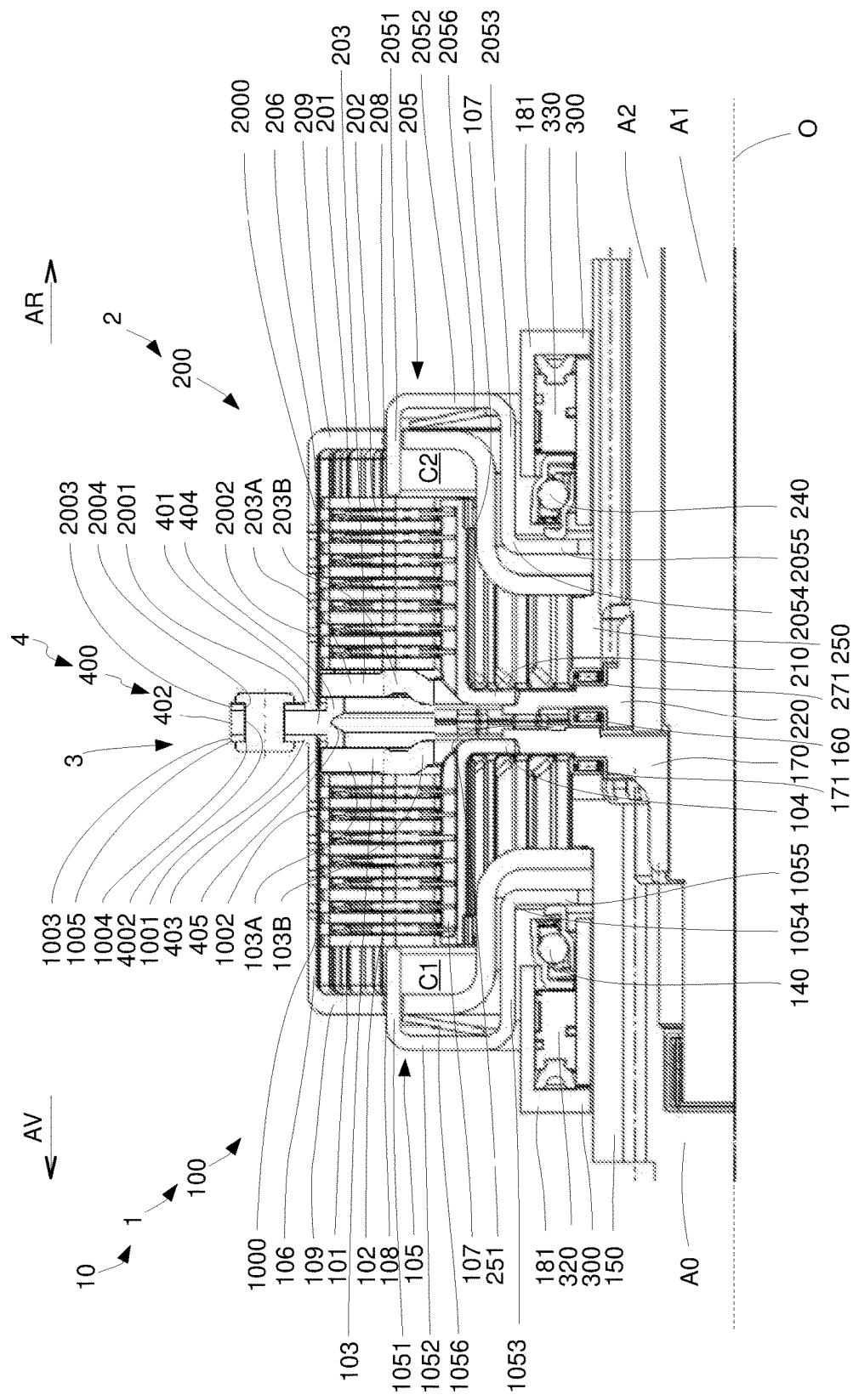
FIG. 1 illustrates a view in section of a first embodiment in which the assemblies are assembled with their corresponding outer disk carrier by first extensions, the reaction members being housed in the cavities and an adjusting device being positioned between the first ends.

The clutch mechanism 10 illustrated in FIG. 1 will first of all be described. It will be noted that the clutch mechanisms 10 of each of the embodiments are identical and can be described in a similar way to the embodiment of FIG. 1.

Thus, as illustrated in FIG. 1, the exemplary embodiment of the clutch mechanism 10 is formed of two assemblies 1, 2. Each assembly 1, 2 forms part of the clutch mechanism 10, the assemblies 1, 2 form the clutch mechanism to.

The clutch mechanism 10 is driven in rotation about an axis O and intended to be fitted to a transmission of a motor vehicle. For that, the clutch mechanism 10 is mounted on a clutch bellhousing of the motor vehicle transmission.

The clutch mechanism 10, preferably of the wet dual-clutch type, and more preferably still in a position referred to as axial, a first clutch 100 forming an assembly 1 situated toward the front AV with respect to a second clutch 200 forming another assembly 2. The dual-clutch mechanism 10 is incorporated into a drivetrain comprising a transmission, these not being depicted in FIG. 1, the transmission being coupled in rotation to the dual-clutch mechanism 10.

In general, the dual-clutch mechanism 10 is designed to be able to rotationally couple an input shaft A0 to a first transmission shaft A1 or, alternatively, to a second transmission shaft A2, via the first clutch 100 or the second clutch 200 respectively.

In the context of the invention, the input shaft A0 is driven in rotation by at least a crankshaft of an engine, for example a combustion engine, not depicted in FIG. 1; and the first and second transmission shafts A1, A2 are intended to be coupled in rotation to the transmission such as, for example, a gearbox of the kind fitted to motor vehicles.

For preference, the first transmission shaft A1 and the second transmission shaft A2 are coaxial. More particularly, the second transmission shaft A2 adopts the form of a hollow cylinder inside which the first transmission shaft A1 can be inserted.

As illustrated in FIG. 1, the first clutch 100 and the second clutch 200 are advantageously of the multi-disk type. Each multi-disk clutch comprises, on the one hand, a plurality of coupling disks 101, 201 rigidly connected in terms of rotation to the input shaft A0 and, on the other hand, a plurality of friction disks 102, 202, rigidly connected in terms of rotation to at least one of the transmission shafts A1, A2. The plurality of coupling disks 101, 201 of each clutch 100, 200 and the plurality of friction disks 102, 202 of each clutch 100, 200 together respectively form a stack.

The first transmission shaft A1 is coupled in terms of rotation to the input shaft A0 and driven in rotation by same when the first clutch 100 is configured in a position referred to as the clutch-engaged position for which the plurality of coupling disks 101 is coupled in terms of rotation to the plurality of friction disks 102. Alternatively, the first transmission shaft A1 is uncoupled in terms of rotation from the input shaft A0 when the first clutch 100 is configured in a position referred to as the clutch-disengaged position for which the plurality of coupling disks 101 is rotationally uncoupled from the plurality of friction disks 102.

Analogously, the second transmission shaft A2 is coupled in terms of rotation to the input shaft A0 and driven in rotation by same when the second clutch 200 is configured in a clutch-engaged position for which the plurality of coupling disks 201 is coupled in terms of rotation to the plurality of friction disks 202. Alternatively, the second transmission shaft A2 is uncoupled in terms of rotation from the input shaft A0 when the second clutch 200 is configured in a position referred to as the clutch-disengaged position for which the plurality of coupling disks 201 is rotationally uncoupled from the plurality of friction disks 202.

In the dual-clutch mechanism 10 illustrated in FIG. 1, the first clutch 100 is designed to engage the odd-numbered gear ratios and the second clutch 200 is designed to engage the even-numbered gear ratios and the reverse gear of the transmission. Alternatively, the ratios handled by said first clutch 100 and second clutch 200 may be respectively reversed.

The first clutch 100 and the second clutch 200 are designed alternatively to transmit power, referred to as input power—a torque and a rotational speed—from the input shaft to one of the two transmission shafts A1, A2, according to the respective configuration of each clutch 100 and 200 and via an input flange 109.

The clutches 100 and 200 are designed not to be in the same clutch-engaged configuration simultaneously. By contrast, the first and second clutches 100, 200 can be simultaneously configured in their clutch-engaged position.

The dual-clutch mechanism 10 will now be described in greater detail.

As depicted in FIG. 1, the dual-clutch mechanism 10 comprises an input element which is coupled in rotation on the one hand to the input shaft A0 and on the other hand to the input flange 109 so as to transmit the power—the torque and the rotational speed—generated at the engine to one of the clutches 100, 200 of the dual-clutch mechanism 10. For preference, the input element of the dual-clutch mechanism 10 comprises an input hub 150, preferably rotating about the axis O. On its lower elongation, the input hub 150 is connected in terms of rotation and/or axially to the input shaft A0, potentially via a damper device, not depicted, such as a dual-mass flywheel for example.

On its outer elongation, the input hub 150 is coupled to the input flange 109 and, more particularly, at a lower end situated toward the rear of said input flange 109. For preference, the input flange 109 and the input hub 150 are rigidly secured to one another, for example fixed by welding and/or by riveting.

On its upper-end side, the input flange 109 of the first clutch 100 is connected in rotation to the first clutch 100 via an outer disk carrier 106 of the first clutch 100, the outer disk carrier 106 being connected to the input flange 109, the input flange 109 and the outer disk carrier 106 preferably being formed integrally in the same material. The outer disk carrier 106 of the first clutch 100 delimits on the outside a cavity C1 in which the stack of coupling disks 101 and of friction disks 102 of the first clutch 100 is housed.

The first and second clutches 100 and 200 are operated by an actuating system 300 which is designed to be able to configure them in any configuration comprised between the clutch-engaged configuration and the clutch-disengaged configuration.

The actuating system 300 comprises:
- a first actuator 320 designed to configure the first clutch 100 in a configuration comprised between the clutch-engaged configuration and the clutch-disengaged configuration;
- a second actuator 300 designed to configure the second clutch 200 in a configuration comprised between the clutch-engaged configuration and the clutch-disengaged configuration;
- a casing 181 of the actuating system 300, in which the first and second actuators 320, 330 are at least partially housed.

For preference, the first and second actuators 320 and 330 are of the hydraulic ram type. The first and second actuators 320, 330 may each comprise an annular piston, each annular piston being coaxial with the axis O and developing an axial movement to configure the corresponding clutch. In that case, the actuator system 300 also comprises a duct supplying hydraulic fluid to each actuator 320, 330. For preference, the hydraulic fluid is a pressurized fluid, for example oil.

The first actuator 320 is connected to the first clutch 100 via, on the one hand, a first clutch-release bearing 140 and, on the other hand, a first force-transmission member 105. The first clutch-release bearing 140 is designed to transmit axial forces generated by the first actuator 320 to the first force-transmission member 105.

The first force-transmission member 105 is designed to transmit an axial force to the first clutch 100 via its upper elongation, said upper elongation extending axially toward the front and through an opening 108 formed in the input flange 109 so as to be able to press the plurality of coupling disks 101 against the plurality of friction disks 102, on the one hand, and against a reaction member 103 of the first clutch 100 on the other hand, this being described later on in greater detail in the various embodiments.

The first force-transmission member 105 takes the form of a crinkled plate curved axially toward the front at its outer radial end. More specifically, the first force-transmission member 105 collaborates with the first clutch 100 via a plurality of axial extension lands 1051 forming upper fingers 1051 which allow the coupling disks 101, 102 of the first clutch 100 to be pushed forward under the effect of a forward axial movement of the first actuator 320.

By way of nonlimiting example, the first force-transmission member 105 can be obtained by pressing.

The first force-transmission member 105 comprises an upper radial extension land 1052 situated forward of the upper fingers 1051. The upper radial extension land 1052 extends radially from the first clutch 100.

An intermediate axial extension land 1053 extends the upper radial extension land 1052 toward the rear of the dual-clutch mechanism 10.

Finally, the first force-transmission member 105 comprises an inner radial extension part 1055 connected to the intermediate axial extension land 1053 via a curved zone 1054. The front face of the inner radial extension part 1055 is in contact with a rear face of the first clutch-release bearing 140 connected to the first actuator 320.

The reaction member 103 is rigidly secured to the outer disk carrier 106 of the first clutch 100. In particular, the reaction member 103 is halted axially toward the rear by an axial end stop. For preference, the reaction member 103 is fixed rigidly to the outer disk carrier 106 of the first clutch by any means of assembly, such as, for example, by riveting or by welding.

The reaction member 103 is configured in such a way as to allow friction coupling of the coupling disks and of the friction disks 101, 102 when the first actuator 320 exerts an axial force toward the rear to configure the first clutch 100 in its clutch-engaged position. Contrastingly, when the first force transmission member 105 is pushed back toward the front by an elastic return washer 1056, the coupling disks 101 separate from the friction disks 102, thus allowing them to be uncoupled and allowing the first clutch 100 to be configured in its clutch-disengaged configuration. It will be appreciated that the elastic return washer 1056 bears against the first force-transmission member 105 and against the input flange 109 and is axially constrained by the input hub 150 and the axial bearing 171.

The reaction member 103 notably has external splines which collaborate with corresponding internal splines of the outer disk carrier 106.

The first clutch 100 is intended to be coupled in rotation to the first transmission shaft A1 via a first output disk carrier 104 forming an output element of said first clutch 100.

More particularly, the first output disk carrier 104 is coupled in rotation to the friction disks 102 at its upper end on the one hand, and, on the other hand, to a first output hub 170 at its lower end.

The first output disk carrier 104 comprises on its outer radial periphery an axial elongation 107 which is equipped with a toothset intended to collaborate with a complementary toothset on each friction disk 102 and, more particularly, at the inner radial periphery of each friction disk 102 of the first clutch 100. The first output disk carrier 104 is thus coupled in rotation by meshing with the friction disks 102 of the first clutch 100.

At its lower radial end, the first output disk carrier 104 is connected to the first output hub 170, these preferably being fixed together by welding or by riveting.

The first output hub 170 comprises radially on the inside axial splines designed to collaborate with complementary splines situated on the first transmission shaft A1, so as to achieve rotational coupling.

The axial bearing 171 is interposed between the first output hub 170 and the input hub 150 so as to withstand the axial forces of the input hub 170 and/or of the input flange 109 despite the different rotational speeds at which the input shaft and the first transmission shaft A1 may respectively be rotating.

Analogously, the second clutch 200 of the dual-clutch mechanism 10 is of a design similar to that of the first clutch 100.

The second actuator 330 is connected to the second clutch 200 via, on the one hand, a second clutch-release bearing 240 and, on the other hand, a second force-transmission member 205. The second clutch-release bearing 240 is designed to transmit axial forces generated by the second actuator 330 to the second force-transmission member 205.

On its upper end side, an input flange 209 of the second clutch 200 is connected in rotation to the second clutch 200 via an outer disk carrier 206 of the second clutch 200, the outer disk carrier 206 of the second clutch 200 being connected to the input flange 209, preferably the input flange 209 and the outer disk carrier 206 are integrally formed in the same material. The outer disk carrier 206 of the second clutch 200 delimits on the outside a cavity C2 in which the stack of coupling disks 201 and of friction disks 202 of the second clutch 200 is housed.

The second force-transmission member 205 is designed to transmit an axial force to the second clutch 200 via its upper elongation, said upper elongation extending axially toward the front and through an opening 208 formed in the outer disk carrier 206 so as to be able to press the coupling disks 201 against the friction disks 202, on the one hand, and against a reaction member 203 of the second clutch 200 on the other hand, this being described later on in greater detail in the various embodiments.

The second force-transmission member 205 takes the form of a crinkled plate curved axially toward the front at its outer radial end. More specifically, the second force-transmission member 205 collaborates with the second clutch 200 via a plurality of axial extension lands 2051 forming inner fingers 2051 which allow the coupling and friction disks 201, 202 of the second clutch 200 to be pushed forward under the effect of a forward axial movement of the second actuator 330.

By way of nonlimiting example, the second force-transmission member 205 can be obtained by pressing.

The second force-transmission member 205 comprises an upper radial extension land 2052 situated to the rear of the upper fingers 2051. The upper radial extension land 2052 extends radially from the second clutch 200.

An intermediate axial extension land 2053 extends the upper radial extension land 2052 under the second clutch 200, toward the front of the dual-clutch mechanism 10. The intermediate axial extension land 2053 is situated radially on the inside of the second clutch 200.

Finally, the second force-transmission member 205 comprises an inner radial extension part 2055 connected to the intermediate axial extension land 2053 via a curved zone 2054. The rear face of the inner radial extension part 2055 is in contact with a front face of the second clutch-release bearing 240 connected to the second actuator 330.

The reaction member 203 of the second clutch 200 is rigidly connected to the outer disk carrier 206 of the second clutch 200. For preference, the reaction member 203 of the second clutch 200 is rigidly secured to the outer disk carrier 206 of the second clutch 200 by any means, such as, for example, by welding or by riveting. The reaction member 203 of the second clutch 200 is configured in such a way as to allow friction coupling of the coupling disks 201 and friction disks 202 when the second actuator 330 exerts a forward axial force in order to configure the second clutch 200 in its clutch-engaged position. Contrastingly, when the second force-transmission member 205 is pushed back toward the rear by an elastic return washer 2056, the coupling disks 201 separate from the friction disks 202 allowing them to become uncoupled and thus allowing the second clutch 200 to be configured in its clutch-disengaged configuration. It will be appreciated that the elastic return washer 2056 bears against the second force-transmission member 205 and against the input flange 209 and is axially constrained by a spacer 250 and by an axial bearing 271.

By way of nonlimiting example, the reaction member 203 of the second clutch 200 may take the form of a ring with a toothset on the external periphery and a central bearing groove which extends axially toward the rear.

The second clutch 200 is intended to be coupled in rotation to the second transmission shaft A2 via a second output disk carrier 210 forming an output element of said second clutch 200. More particularly, the second output disk carrier 210 is coupled in rotation to the friction disks 202 at its upper end on the one hand, and on the other hand to a second output hub 220 at its lower end.

The second output disk carrier 210 comprises on its outer radial periphery an axial elongation 207 which is equipped with a toothset intended to collaborate with a complementary toothset on each friction disk 202 and, more particularly, at the inner radial periphery of each friction disk 202 of the second clutch 200. The second output disk carrier 210 is thus coupled in rotation by meshing with the friction disks 202 of the second clutch 200.

At its lower radial end, the second output disk carrier 210 is connected to the second output hub 220, these preferably being fixed together by welding or by riveting. Furthermore, an axial bearing 160 is interposed between the first output hub 170 and the second output hub 220 so as to be able to transmit an axial force between the two output disk carriers 104, 210 which may be rotating at different speeds when the first and second clutches 100, 200 are configured in a different configuration. It will be appreciated that an axial clearance remains in the stack of the first output hub 170, of the second output hub 220 and of the axial bearing 160. This inter-clutch axial clearance makes it possible not to damage the axial bearing 160. In the example illustrated, the axial clearance is between a projecting part of the first output hub 170 and the axial bearing 160.

The second output hub 220 comprises radially on the inside axial splines designed to collaborate with complementary splines situated on the second transmission shaft A2, so as to achieve rotational coupling.

The axial bearing 271 is interposed between the second output hub 220 and the spacer 250 connected to the input flange 209 of the second clutch 200 so as to withstand the axial forces of the spacer 250 and/or of the input flange 209 in spite of the different rotational speeds at which the input shaft and the second transmission shaft A2 may respectively be rotating. It will be appreciated that an axial clearance remains in the stack of the second output hub 220 and of the spacer 250 in order not to constrain these and therefore not to damage them.

The first and second clutches 100, 200 respectively comprise elastic return washers 1056, 2056. The elastic return washers 1056, 2056 are designed to generate a return force directed axially respectively toward the front and toward the rear so as to automatically push the first and second actuator 320, 330 respectively back toward the front and back toward the rear. More particularly, the elastic return washers 1056, 2056 axially urge the first and second force-transmission members 105, 205 respectively toward the front and toward the rear so as to facilitate the separation of the coupling disks 101, 201 from the friction disks 102, 202 of the first and second clutches 100, 200 respectively by pushing the first and second actuator 320, 330 respectively back toward the front and back toward the rear.

The remainder of the description will describe the outer disk carriers 106, 206 of the assemblies 1, 2 and, more particularly, the adjusting device 4 for setting the axial distance separating the two clutches and the assembly device 3 for assembling the two assemblies 1, 2 with one another. As described hereinafter, there are a number of conceivable embodiments for setting the axial distance separating the two clutches and in order to assemble the assemblies 1, 2 with one another. Thus, the clutch mechanism 10 comprises several embodiments of the setting of the axial distance separating the two clutches and/or for the assembling of the outer disk carriers 106, 206 of each assembly 1, 2 with one another and/or several embodiments for setting the axial distance separating the two clutches using a spacer 400 or the reaction members 103, 203, for assembling the spacer 400 or the reaction members 103, 203 with respect to one another and/or on the corresponding outer disk carriers 106, 206. It will be appreciated that such a clutch mechanism 10 may comprise any combination of the embodiments for assembling the outer disk carriers 106, 206 of each assembly 1, 2 with one another and/or of the embodiments for assembling the spacer 400 or the reaction members 103, 203 relative to one another and/or on the corresponding outer disk carriers 106, 206. It will also be noted that such a clutch mechanism 10 may be produced by an alternation of two complementary embodiments, for example an embodiment whereby two assemblies 1, 2 are assembled via their outer disk carriers 106, 206 using the spacer 400 and another embodiment in which the reaction members 103, 203 are fixed together and/or to their corresponding outer disk carriers 106, 206.

In general, in each of the embodiments, the outer disk carrier 106 of the first clutch 100 of the corresponding assembly 1 comprises a first axial elongation land 1000 directed toward the rear in the direction of the second clutch 200 of the other assembly 2. The first axial elongation land 1000 delimits radially toward the outside the cavity C1 inside which the first clutch 100 is housed. The outer disk carrier 206 of the second clutch 200 of the assembly 2 comprises a second axial elongation land 2000 directed toward the front in the direction of the first clutch 100 of the assembly 1. The second axial elongation land 2000 delimits radially toward the outside the cavity C2 inside which the second clutch 200 is housed. As depicted, the first axial elongation land woo and the second axial elongation land 2000 respectively comprise a peripheral edge 1001, 2001 situated at their respective axial end. It will therefore be appreciated that each assembly 1, 2 comprises a peripheral edge 1001, 2001. The peripheral edge 1001 of the first axial elongation land woo and the peripheral edge 2001 of the second axial elongation land 2000 respectively extend radially toward the outside beyond the respective axial end of the first axial elongation land 1000 and of the second axial elongation land 2000. It will be noted that the respective peripheral edge 1001, 2001 of the first axial elongation land 1000 and of the second axial elongation land 2000 are circular about the axis O, as depicted for example in FIG. 1 or 2. As illustrated, the peripheral edges 1001, 2001 of the assemblies 1, 2 are integrally formed in the same material. For preference, the peripheral edge 1001, 2001 of one assembly 1, 2 may be machined by the facing surface of the other peripheral edge 1001, 2001. This machining step has the effect of ensuring the tolerancing between the two assemblies 1, 2 of the clutch mechanism 10. It will be appreciated in this respect that the outer disk carrier 106, 206 of each assembly 1, 2 is axially dimensioned in such a way as to provide the positioning and assembly thereof relative to one another. In particular, it will be emphasized that the outer disk carriers 106, 206 of the assemblies 1,2 are dimensioned in such a way as to ensure the positioning of the axial bearing 160 interposed between the first output disk carrier 104 and the second output disk carrier 210. Discharge holes 1002, 2002 formed radially on the first axial elongation land 1000 and the second axial elongation land 2000 respectively allow the hydraulic fluid contained in the cavities C1, C2 of the clutches 100, 200 to be partially discharged. It will also be noted that no axial adjustment spacer is interposed between the first output hub 170 and the axial bearing 160.

It will also be noted that the outer disk carriers 106, 206 of the assemblies 1, 2 are identical, particularly that the first axial elongation land 1000 and the second axial elongation land 2000 have identical axial dimensions. It will be appreciated that the stack of coupling disks 101, 201 and of friction disks 102, 202 of the first and second clutches 100, 200 are therefore identical in number. By virtue of this feature, it is possible to reduce production costs when producing such clutch mechanisms 10. This is because the outer disk carrier 106, 206 of the assemblies 1, 2 can then be common to the first and second clutches 100, 200.

However, the invention is not restricted to this configuration and the outer disk carriers 106, 206 of the assemblies 1, 2 may be identical, particularly the first axial elongation land 1000 and the second axial elongation land 2000 may have identical axial dimensions whereas the stack of coupling disks 101, 201 and of friction disks 102, 202 of the first and second clutches 100, 200 may be non-identical in number.

As an alternative form of the invention, the outer disk carriers 106, 206 of the assemblies 1, 2 may be non-identical, particularly the first axial elongation land 1000 and the second axial elongation land 2000 may have different axial dimensions. By virtue of this configuration it is possible to produce clutch mechanisms 10 in which the stack of coupling disks 101, 201 and of friction disks 102, 202 of the first and second clutches 100, 200 are different in number, depending on the torques to be transmitted between the input shaft and the corresponding output shaft. It will be appreciated that, unlike a clutch mechanism 10 in which the outer disk carriers 106, 206 are formed integrally in the same material, it is possible to combine assemblies 1, 2 in order to create a desired clutch mechanism 10. For example, the first clutch 100 may comprise an even number of coupling disks 101 and of friction disks 102, while the second clutch 200 may comprise an odd number of coupling disks 201 and of friction disks 202. Thus, one assembly 1, 2 can be combined with another assembly 1, 2 in order to arrive at the desired clutch mechanism 10.

Figure 2:
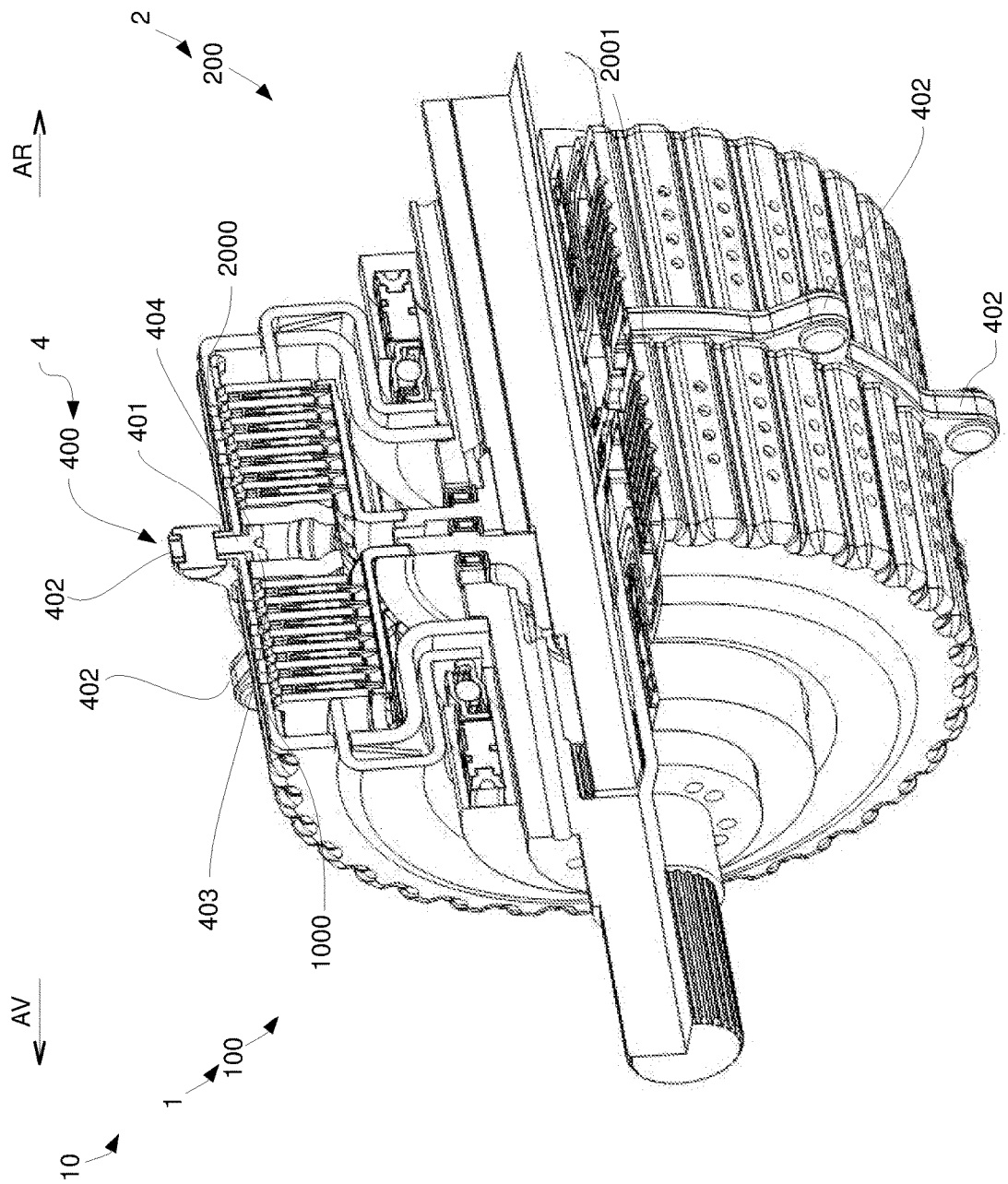
FIG. 2 illustrates a perspective view of the first embodiment of FIG. 1.

According to a first embodiment illustrated in FIGS. 1 and 2, the reaction member 103, 203 of each assembly 1, 2 is fully housed in the respective cavity C1, C2 of the corresponding outer disk carrier 106, 206. The reaction member 103, 203 of each assembly 1, 2 is therefore housed in the cavity C1, C2 some distance from the peripheral edge 1001, 2001 of the corresponding outer disk carrier 106, 206. More particularly, each reaction member 103, 203 bears, via a radially outer part 103A, 203A extending radially toward the outside with respect to the axis, against the stack of coupling disks 101, 201 and of friction disks 102, 202 of the corresponding clutch 100, 200. A radially inner part 103B of the reaction member 103 of the first clutch 100 extends chiefly axially, with respect to the axis, toward the rear following on from the radially outer part 103A of the reaction member 103 of the first clutch 100, while a radially inner part 203B of the reaction member 203 of the second clutch 200 extends chiefly axially toward the front following on from the radially outer part 203A of the second clutch 200. Thus it will be appreciated that the radially inner parts 103B, 203B extend toward one another. With this same configuration, the reaction members 103, 203 bear respectively via their radially outer part 103A, 203A against the stack of coupling disks 101, 201 and of friction disks 102, 202 of the corresponding clutch 100, 200. It will be appreciated that the reaction members 103, 203 are circular in shape and exhibit symmetry of revolution about the axis O and are annular at their center.

According to this first embodiment, the peripheral edges 1001, 2001 of the assemblies 1, 2 are positioned in such a way as to face one anther; more particularly, the peripheral edges 1001, 2001 of the assemblies 1, 2 are symmetric with respect to one another.

As illustrated, the adjusting device 4 is formed by a spacer 400 positioned between the two disk carriers 106, 206 and more particularly between the peripheral edges 1001, 2001 of the disk carriers 106, 206. The spacer 400 is attached to the two disk carriers 106, 206. More specifically, the spacer 400 is positioned between first extensions 1003, 2003 of the disk carriers 106, 206. This spacer 400 makes it possible to set an axial distance separating the two clutches 100, 200, also known as the inter-clutch clearance, located between the first and second output hubs and the axial bearing 160. Such a spacer 400 also makes it possible to set an internal axial clearance for each clutch 100, 200. In this configuration, the spacer 400 keeps each of the reaction members 103, 203 bearing against the corresponding clutch 100, 200; in this instance, the spacer 400 keeps the reaction members 103, 203 bearing against the stacks of coupling disks 101, 201 and of friction disks 102, 202 of the corresponding clutch 100, 200.

The spacer 400 that forms the adjusting device 4 has a T-shaped cross section. In this exemplary embodiment, the spacer 400 is circular in shape and comprises an annular part 401 at its center. More specifically, the spacer 400 comprises a plurality of radial projections with respect to the axis O providing bearing pressure against the first extensions 1001, 2001 of each of the outer disk carriers 106, 206. The radial projections extend from the annular part 401 radially, with respect to the axis O, chiefly to the outside of the cavity C1, C2 of the corresponding assembly 1, 2, namely beyond the peripheral edge 1001, 2001 of the corresponding outer disk carrier 106, 206. The annular part 401 of the spacer 400 is of a thickness, measured axially, that is identical to the thickness, measured axially, of the radial projections. In this way it will be appreciated that the annular part 401 or the radial projections therefore also bear against the peripheral edges 1001, 2001 of the outer disk carriers 106, 206. These radial projections make it possible to set the axial distance separating the two clutches 100, 200. It will therefore be appreciated that the spacer 400, particularly its radial projection, makes it possible to compensate for the absence of a spacer 400 positioned between the first output hub 170 and the axial bearing 160. Thus, the radial projections of the spacer 400 make it possible to set an axial position of the clutches 100, 200 relative to one another so that the disk carrier 106 of the first clutch 100 is positioned axially with respect to the disk carrier 206 of the second clutch 200 in such a way as to avoid, amongst other things, the clutches 100, 200 not being constrained relative to one another. In this configuration, the thickness, measured axially, of the radial projections is dimensioned to make it possible to set the axial distance or axial position separating the two clutches 100, 200.

The spacer 400 furthermore comprises a first axial projection 403 providing bearing pressure against one of the reaction members 103, 203. In this particular instance, this first axial projection 403 provides axial bearing pressure against the reaction member 103 of the first clutch 100. This first axial projection 403 extends, from the annular part 401, axially in the direction of the first clutch 100 and makes it possible to set the internal axial clearance for the first clutch 100. This axial clearance of the first clutch 100 makes it possible to set the position of the start of travel and end of travel of the first clutch 100 according to whether this clutch is in a clutch-engaged or a clutch-disengaged position. This axial clearance of the first clutch 100 is determined by the thickness, measured axially, of the first axial projection 403.

Similarly, the spacer 400 comprises a second axial projection 404 providing bearing pressure against one of the reaction members 103, 203. In this particular instance, this second axial projection 404 provides axial bearing pressure against the reaction member 203 of the second clutch 200. This second axial projection 404 extends, from the annular part 401, axially in the direction of the second clutch 200 and makes it possible to set the internal axial clearance for the second clutch 200. This axial clearance of the second clutch 200 makes it possible to set the position of the start of travel and end of travel of the second clutch 200 according to whether this clutch is in a clutch-engaged or a clutch-disengaged position. This axial clearance of the second clutch 200 is determined by the thickness, measured axially, of the second axial projection 404. In the configuration illustrated, the first axial projection and the second axial projection have identical axial dimensions. It will also be noted that the thickness, measured axially, of the first axial projection and of the second axial projection does not include the thickness, measured axially, of the radial projection 402.

According to this first embodiment, the T-shaped cross section of the spacer 400 is formed by the annular part 401 from which extend the radial projections, the first axial projection 403 and the second axial projection 404. In the example of FIGS. 1 and 2, the first axial projection 403 and the second axial projection 404 exhibit symmetry of revolution about the axis O.

It will also be noted that the spacer 400 comprises, on an interior contour of the annular part 401, a rib 405 with a V-shaped cross section. The rib 405 exhibits symmetry of revolution about the axis O. This rib 405 has the function of uncoupling the operation of the two clutches 100, 200 when one of these clutches is in a clutch-engaged position. One of the clutches 100, 200 can then be used while limiting dependency on the other clutch 100, 200. In other words, when one of the clutches 100, 200 is subjected to an axial force in a position in which the to coupling disks 101, 201 and friction disks 102, 202 are compressed against its reaction member 103, 203, the rib 405 limits the force of reaction transmitted to the other clutch 100, 200. In other words, the rib 405 makes it possible to allow the first axial projection 403 and/or the second axial projection 404 to move axially without interaction with the second axial projection 404 and/or respectively with the first axial projection 403.

The invention is not restricted to this configuration of the disk carriers 106, 206, it being possible for the first axial projection 403 and the second axial projection 404 to be of different axial dimensions, particularly when the number of coupling disks 101, 201 and of friction disks 102, 202 of one clutch 100, 200 differs from the number of coupling disks 101, 201 and friction disks 102, 202 of the other clutch 100, 200.

As an alternative, the spacer 400 could, for example, be of Y-shaped cross section, in which case the first axial projection 403 and the second axial projection 404 would extend axially and radially in the direction of their corresponding clutch 100, 200. The axial clearance of these clutches 100, 200 would then correspond to a measurement of the first axial projection 403 or of the second projection measured from the annular part 401 as far as the end of the first axial projection or of the second axial projection 404 in contact with the corresponding reaction member 103, 203.

In this configuration, each radially outer part 103A, 203A of the reaction members forms a pressure zone bearing axially against their coupling disks 101, 201 and friction disks 102, 202 of the corresponding clutch 100, 200. It will be appreciated that the reaction members 103, 203 are axially distant from one another so as not to be in contact with one another.

In the configuration of the first embodiment illustrated in FIG. 1 or 2, the peripheral edges 1001, 2001 are intended to bear axially against the spacer 400 when the two assemblies 1, 2 are assembled to form the clutch mechanism 10.

As illustrated in FIGS. 1 and 2, the outer disk carrier 106 of the first clutch 100 comprises first extensions 1003. In exactly the same way, the outer disk carrier 206 of the second clutch 200 comprises first extensions 2003. The first extensions 1003, 2003 of the outer disk carriers 106, 206 extend radially toward the outside beyond the respective peripheral edges 1001, 2001 of the corresponding outer disk carriers 106, 206. It will be appreciated that the first extensions 1003, 2003 of the outer disk carriers 106, 206 also extend from the respective peripheral edges 1001, 2001 of the corresponding outer disk carriers 106, 206. As depicted, the respective first extensions 1003, 2003 of each outer disk carrier 106, 206 are angularly distributed around the peripheral edge 1001, 2001 of the corresponding outer disk carrier 106, 206. It will be appreciated that the respective first extensions 1003, 2003 of each outer disk carrier 106, 206 are uniformly angularly distributed about the axis O.

By way of example, each outer disk carrier 106, 206 may comprise eight first extensions 1003, 2003.

As an alternative, the first extensions 1003, 2003 of each radially outer part 103A, 203A and their respective peripheral edge 1001, 2001 are integrally formed in the same material. For preference, the first extensions 1003, 2003 of each radially outer part 103A, 203A are attached on their respective peripheral edge 1001, 2001.

It will also be noted that the first extensions 1003 of the outer disk carrier 106 of the assembly 1 formed by the first clutch 100 are configured to face the first extensions 2003 of the outer disk carrier 206 of the assembly 2 formed by the second clutch 200. More particularly, the first extensions 1003 of the outer disk carrier 106 of the assembly 1 formed by the first clutch 100 are configured to bear axially, via the radial projections of the spacer 400, against the first extensions 2003 of the outer disk carrier 206 of the assembly 2 formed by the second clutch 200. The first extensions 1003, 2003 of the outer disk carriers 106, 206 and the radial projections are also configured to partially form an assembly device 3 for assembling the two assemblies 1, 2 with one another.

According to this first embodiment of the invention, the assembly device 3 comprises each pair of first extensions 1003, 2003 made up of a first extension 1003 of the outer disk carrier 106 of the assembly 1 formed by the first clutch 100 facing a first extension 2003 of the outer disk carrier 206 of the assembly 2 formed by the second clutch 200, as well as each radial projection 402 associated with this pair.

As illustrated in FIG. 1, each first extension 1003 of the outer disk carrier 106 of the assembly 1 formed by the first clutch 100 comprises assembly holes 1004 in register with assembly holes 2004 of the first extensions 2003 of the outer disk carrier 206 of the assembly 2 formed by the second clutch 200. In addition, the radial projections of the spacer 400 each comprise an assembly opening 4002 passing axially through the radial projections and in register with the assembly holes 1004, 2004 of the first extensions 1003, 2003 of the outer disk carriers 106, 206. Per pair of first extensions 1003, 2003 as defined hereinabove, a rivet 105 is intended to pass through the assembly holes 1004, 2004 of a first extension 1003, 2003 of the outer disk carrier 106, 206 of each assembly 1, 2 and through an assembly opening 4002 of a radial projection of the spacer 400.

It will be appreciated that, in order to be able to assemble the two assemblies 1, 2 with one another using the first extensions 1003, 2003, the rivet 1005 of each pair of first extensions 1003, 2003 is pressed so that it extends radially beyond the assembly holes 1004, 2004 so as to keep the first extensions 1004, 2004 of each pair firmly clamped.

According to this first embodiment of the invention, the assembly device 3 further comprises each of the rivets 1005 as described hereinabove. More particularly, the assembly device 3 comprises each pair of first extensions 1003, 2003 associated with a radial projection and each rivet 1005 intended to collaborate with said pair.

As an alternative form of the invention, the assembly holes 1004, 2004 of the first extensions 1003, 2003 are tapped holes configured to each accept an assembly screw.

Figure 2B:
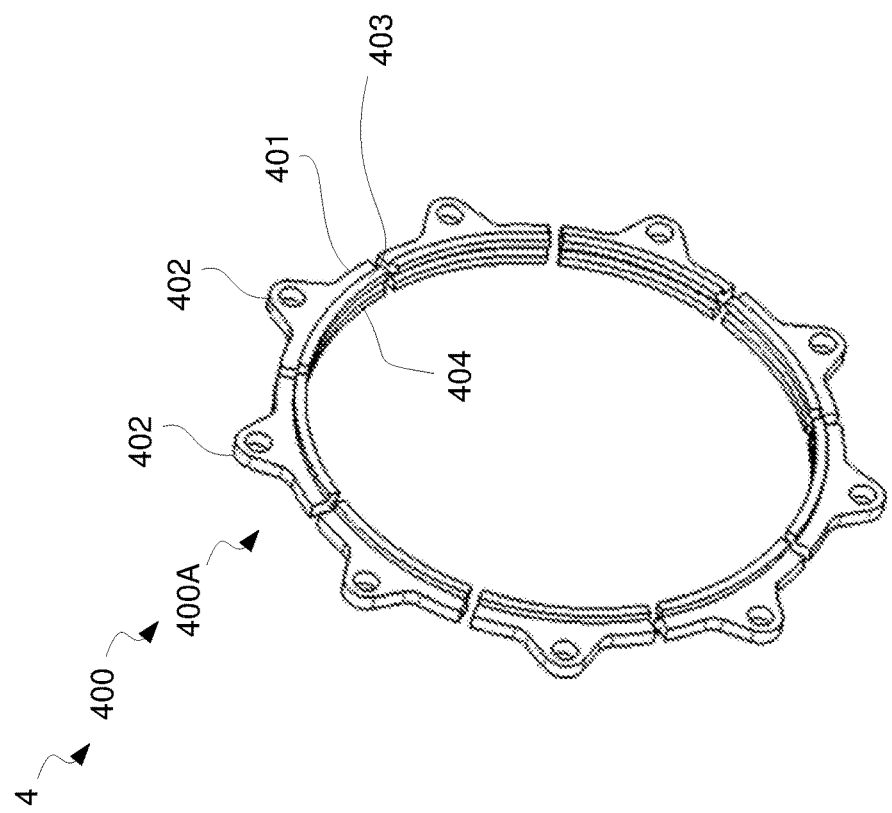
FIG. 2B illustrates a perspective view of the spacer according to another embodiment.
Figure 2A:
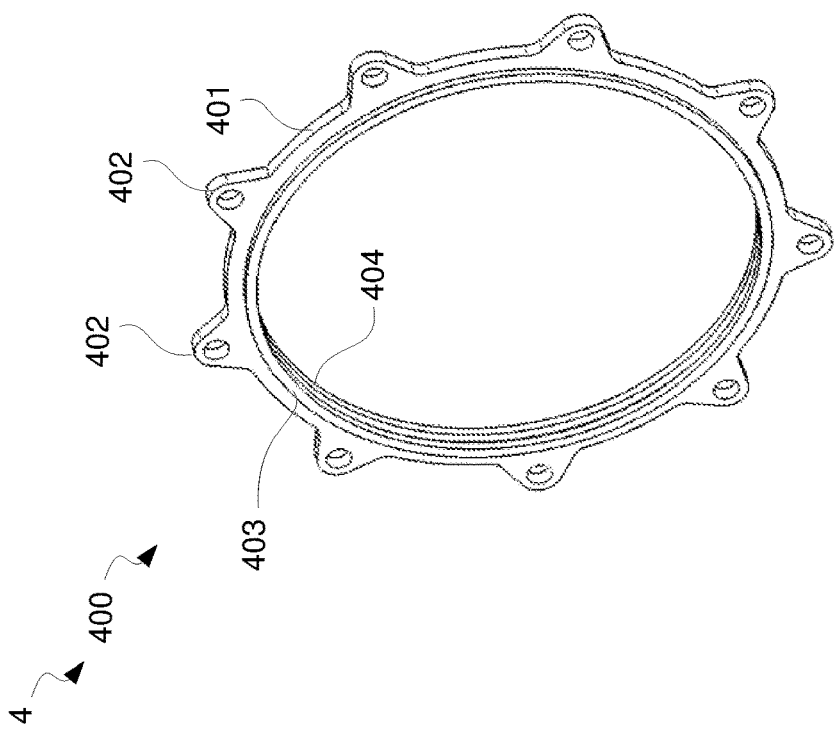
FIG. 2A illustrates a perspective view of the spacer of the first embodiment of FIG. 1.

FIG. 2A illustrates the spacer 400 according to the embodiment of FIG. 1 or 2. The spacer 400 forms a single piece and comprises an annular part 401, radial projections 402, a first axial projection 403 and a second axial projection 404.

FIG. 2B illustrates the spacer 400 according to another embodiment. The spacer 400 is formed of a plurality of curved sectors 400A angularly spaced apart from one another. Each curved sector comprises its annular part 401, its radial projections 402, its first axial projection 403 and its second axial projection 404.

Figure 3:
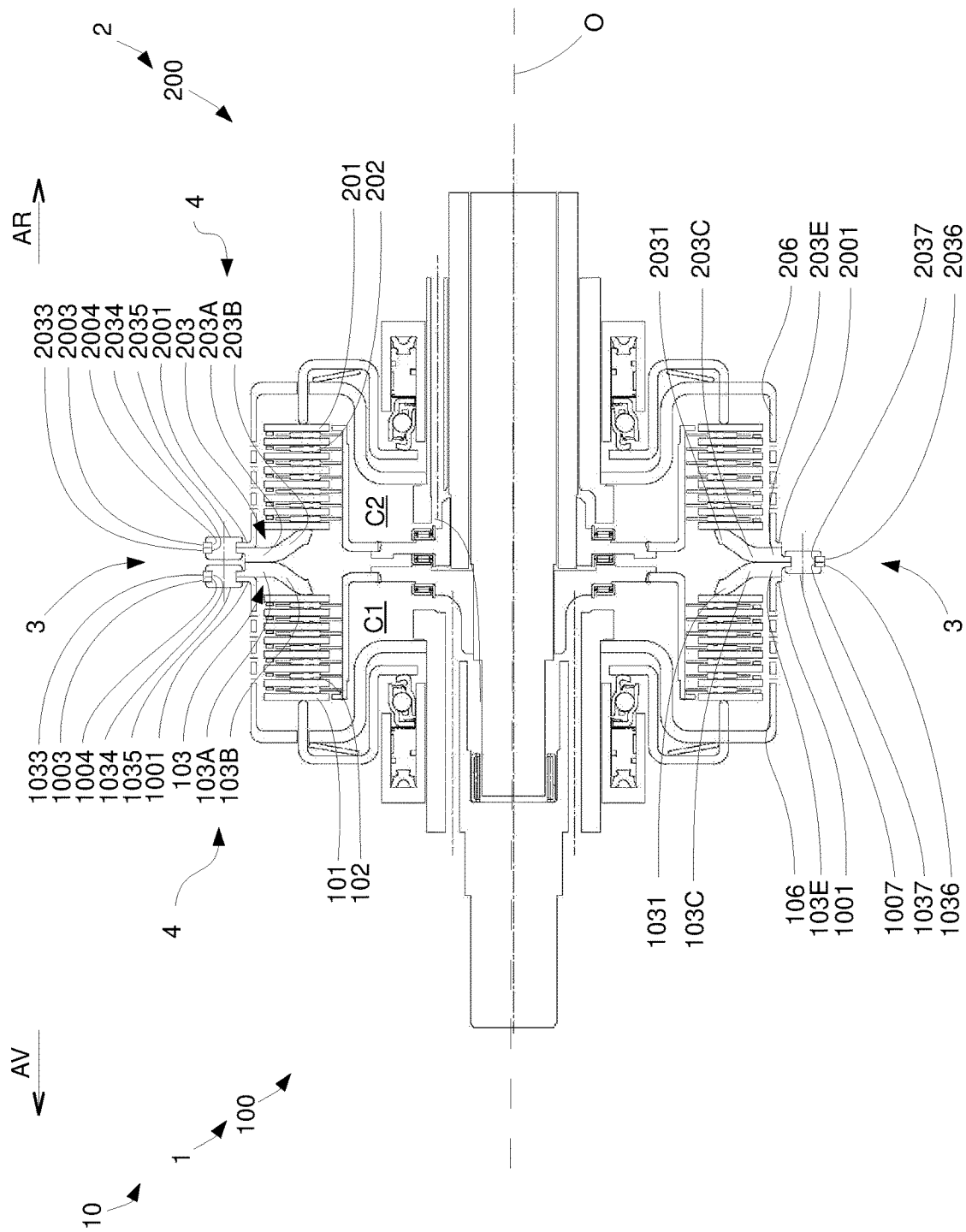
FIG. 3 illustrates a view in section of a second embodiment in which the reaction members form the adjusting device and are assembled with their corresponding disk carrier by first angular sectors in register with the first extensions of the disk carriers, and the disk carriers of the assemblies are assembled with one another by second angular sectors of the reaction members.
Figure 4:
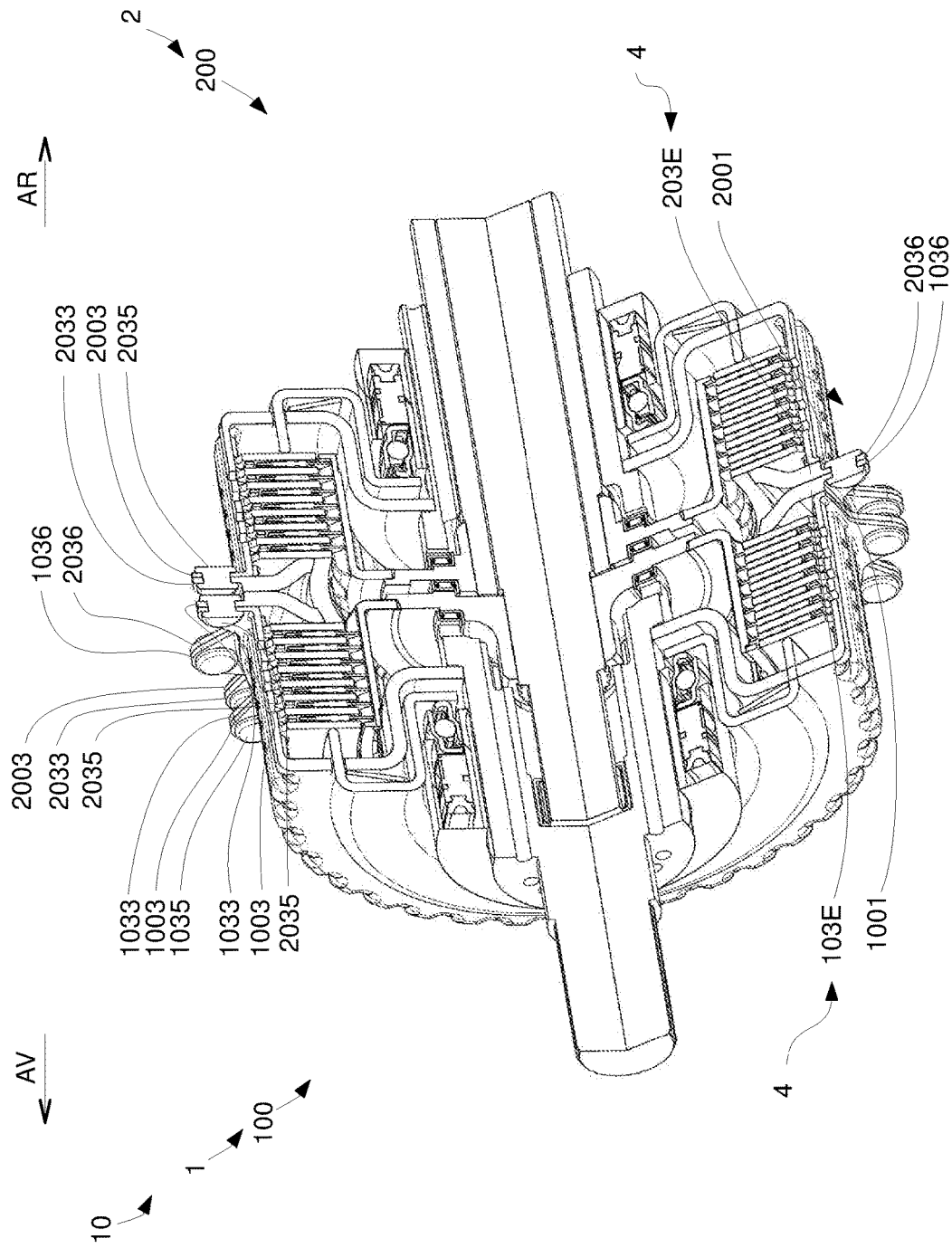
FIG. 4 illustrates a perspective view of the second embodiment of FIG. 3.

According to a second embodiment illustrated in FIGS. 3 and 4 and unlike to in the first embodiment described previously, the reaction member 103, 203 of each assembly 1, 2 extends in part radially beyond the respective cavity C1, C2 of the outer disk carrier 106, 206 of the corresponding assembly 1, 2. The reaction members 103, 203 are housed in their respective cavity C1, C2. In this configuration and unlike in the first embodiment, the reaction members 103, 203 bear axially against one another, at least at their radially outer part 103, 203.

The reaction members 103, 203 are also circular in shape exhibiting symmetry of revolution about the axis O and are annular at their center.

More particularly, each reaction member 103, 203 comprises a radially outer part 103A, 203A extending radially chiefly to the outside of the cavity C1, C2 namely beyond the peripheral edge 1001, 2001 of the corresponding outer disk carrier 106, 206, and a radially inner part 103B, 203B situated inside the cavity C1, C2, namely on the inside relative to the peripheral edge 1001, 2001 of the corresponding outer disk carrier 106, 206. Each reaction member 103, 203 formed by the radially outer part 103A, 203A and the radially inner part 103B, 203B therefore has an S-shaped cross section. It will be noted that the radially outer part 103A, 203A and radially inner part 103B, 203B of each reaction member 103, 203 respectively have an end 103C, 203C in common. The radially inner part 103B, 203B of each reaction member 103, 203 of the assemblies 1, 2 comprises an inner radial edge 1031, 2031 which extends axially and radially in the direction of the clutch 100, 200 of said corresponding assembly 1, 2. The radially outer part 103A, 203A and the radially inner part 103B, 203B of each reaction member 103, 203 together exhibit an S-shaped cross section.

However, the invention is not restricted to this configuration. In this particular instance, the radially outer part 103A, 203A and the radially inner part 103B, 203B of each reaction member 103, 203 may together exhibit an L-shaped cross section. In that case, unlike the radially outer part 103A, 203A and the radially inner part 103B, 203B which were described hereinabove in this second embodiment, the radially inner part 103B, 203B of each reaction member 103, 203 of the assemblies 1, 2 would comprise an inner radial edge 1031, 2031 that extends axially in the direction of the clutch 100, 200 of said corresponding assembly 1, 2.

In the configuration illustrated in FIGS. 3 and 4, the radially inner part 103B, 203B of each reaction member 103, 203 bears axially via an inner radial edge 1031, 2031 against the stack of coupling disks 101, 201 and friction disks 102, 202 of the corresponding clutch 100, 200. As depicted, the radially inner part 103B of the reaction member 103 of the first clutch 100 extends axially and radially toward the front following on from the radially outer part 103A of the reaction member 103 of the first clutch 100 whereas the radially inner part 203B of the reaction member 203 of the second clutch 200 extends axially and radially toward the rear following on from the radially outer part 203A of the reaction member 203 of the second clutch 200. Thus it will be appreciated that the second parts 103B, 203B extend away from one another. A non-zero axial separation is thus formed between the radially inner parts 103B, 203B of the reaction members 103, 203 of the assemblies 1, 2, this clearance being measured axially.

In this second embodiment, unlike in the first embodiment, the adjusting device 4 is formed by the reaction members 103, 203. Likewise, the reaction members 103, 203 make it possible to set an axial distance separating the two clutches 100, 200, also referred to as the inter-clutch clearance, located between the first and second output hubs and the axial bearing 160. Such reaction members also make it possible to set an internal axial clearance for each clutch 100, 200, also referred to as the intra-clutch clearance. The adjusting device 4 comprises the radially outer part 103A, 203A of each reaction member 103, 203 extending radially chiefly to the outside of the cavity C1, C2, namely beyond the peripheral edge 1001, 2001 of the corresponding outer disk carrier 106, 206. It will be appreciated that the radially outer part 103A, 203A of each reaction member 103, 203 extends radially with respect to the axis O and bears axially the one against the other. These radially outer parts 103A, 203A of the reaction members 103, 203 make it possible to set the axial distance separating the two clutches 100, 200. It will therefore be appreciated that the reaction members 103, 203, particularly the radially outer part 103A, 203A thereof, make it possible to compensate for the absence of a spacer positioned between the first output hub 170 and the axial bearing 160. Thus, the radially outer parts 103A, 203A of the reaction members 103, 203 make it possible to set an axial position of the clutches 100, 200 relative to one another in such a way that the disk carrier 106 of the first clutch 100 is positioned axially with respect to the disk carrier 206 of the second clutch 200 in to such a way as to avoid, amongst other things, the clutches 100, 200 not being constrained with respect to one another. In this configuration, the thickness, measured axially, of the radially outer part 103A, 203A of each reaction member 103, 203 allows the setting of the axial distance separating the two clutches 100, 200. In the example illustrated, the radially outer parts 103A, 203A have the same axial thicknesses as one another, measured axially.

According to one alternative form, the radially outer parts 103A, 203A have thicknesses, measured axially, different from one another. This configuration is particularly advantageous when the number of coupling disks 101, 201 and of friction disks 102, 202 of one clutch 100, 200 differs from the number of coupling disks 101, 201 and friction disks 102, 202 of the other clutch 100, 200. In this configuration, the disk carriers 106, 206 of the assemblies may have different axial dimensions.

Furthermore, the adjusting device 4 comprises the radially inner part 103B, 203B of each reaction member 103, 203 situated inside the cavity C1, C2, namely on the inside with respect to the peripheral edge 1001, 2001 of the corresponding outer disk carrier 106, 206. The radially inner part 103B, 203B of the reaction member 103, 203 extends axially and radially with respect to the axis O. The radially inner part 103B, 203B of each reaction member 103, 203 extends radially with respect to the axis O and makes it possible to set an internal axial clearance for the corresponding clutch 100, 200, also referred to as the intra-clutch clearance.

The inner radial edge 1031, 2031 of the radially inner part 103B, 203B of each reaction member 103, 203 bearing against the corresponding clutch 100, 200 is axially offset with respect to an outer radial edge 103E, 203E of the radially outer part 103B, 203B of the same reaction member 103, 203 bearing against the corresponding outer disk carrier 106, 206. A width of the radially inner part 103B, 203B of each reaction member 103, 203, measured axially between the inner radial edge 1031, 2031 of a reaction member 103, 203 bearing against the clutch 100, 200 and the outer radial edge 103E, 203E bearing against the outer disk carrier 106, 206 determines the internal axial clearance for each clutch 100, 200.

It will be appreciated that, when assembling an assembly 1, 2, the reaction member 103, 203 is selected both according to the width, measured axially, of the to radially inner part 103B, 203B so as to set the axial clearance internal to the corresponding clutch 100, 200 and selected according to the thickness, measured axially, of the radially outer part 103A, 203A so as to set the axial distance separating the two clutches 100, 200.

In the same way as in the first embodiment, the peripheral edges 1001, 2001 of the assemblies 1, 2 are arranged in such a way as to face one another, more particularly, the peripheral edges 1001, 2001 of the assemblies 1, 2 are symmetric with respect to one another.

The first parts 103A, 203A of the reaction members 103, 203 are configured to both bear axially against one another and bear axially via an outer radial edge 103E, 203E against, respectively, the peripheral edge 1001, 2001 of the corresponding outer disk carrier 106, 206. As depicted, the outer radial edge 103E, 203E of a reaction member 103, 203 lies radially flush with the peripheral edge 1001, 2001 of the corresponding outer disk carrier 106, 206.

In order to secure the reaction members 103, 203 rigidly to their respective outer disk carrier 106, 206, the radially outer part 103A, 203A of each reaction member 103, 203 comprises the outer radial edge 103E, 203E from which there extend radially outward first angular sectors 1033, 2033 in any number, these preferably being uniformly angularly distributed about the axis O.

In the same way as in the first embodiment and as illustrated in FIGS. 3 and 4, the outer disk carrier 106 of the first clutch 100 comprises first extensions 1003. Identically, the outer disk carrier 206 of the second clutch 200 comprises first extensions 2003. The first extensions 1003, 2003 of the outer disk carriers 106, 206 extend radially toward the outside beyond the respective peripheral edges 1001, 2001 of the corresponding outer disk carriers 106, 206. As depicted in FIG. 4, the respective first extensions 1003, 2003 of each outer disk carrier 106, 206 are angularly distributed about the peripheral edge 1001, 2001 of the corresponding outer disk carrier 106, 206.

By way of example, each outer disk carrier 106, 206 may comprise eight first extensions 1003, 2003.

In the configuration of the second embodiment illustrated in FIG. 3 or 4, the radially outer part 103A, 203A of the reaction member 103, 203 of at least one assembly 1, 2 is designed to collaborate with the first extensions 1003, 2003 of the corresponding outer disk carrier 106, 206 with a view to assembling the reaction member 103, 203 with its corresponding outer disk carrier 106, 206. More particularly, each first angular sector 1033, 2033 of the corresponding reaction member 103, 203 is configured to collaborate with a first extension 2003 of the corresponding outer disk carrier 106, 206 with a view to assembling the reaction member 103, 203 with its corresponding outer disk carrier 106, 206.

It will also be noted that the first angular sectors 1033, 2033 of a reaction member 103, 203 of one assembly 1, 2 are configured to face the first extensions 1003, 2003 of the outer disk carrier 106, 206 of the same assembly 1, 2. More particularly, the first angular sectors 1033, 2033 of a reaction member 103, 203 of one assembly 1, 2 are configured to bear axially against the first extensions 1003, 2003 of the outer disk carrier 106, 206 of the same assembly 1, 2.

By way of example, each reaction member 103, 203 may comprise eight first angular sectors 1033, 2033 configured to collaborate respectively with the eight first extensions 1003, 2003.

According to this second embodiment of the invention, the assembly device 3 comprises each pair of first angular sector 1033, 2033 and first extension 1003, 2003 made up of a first angular sector 1033, 2033 of a reaction member 103, 203 of one assembly 1, 2 facing a first extension 1003, 2003 of the outer disk carrier 106, 206 of the same assembly 1, 2.

Per pair of first angular sector 1033, 2033 and first extension 1003, 2003, a rivet 1035, 2035 is intended to pass through an assembly orifice 1034, 2034 formed in a first angular sector 1033, 2033 of the radially outer part 103A, 203A of the reaction member 103, 203 of one assembly 1, 2 and to pass through an assembly hole 1004, 2004 formed in a first extension 1003, 2003 of the outer disk carrier 106, 206 of the same assembly 1, 2. It will be appreciated that the assembly orifices 1034, 2034 formed in each of the first angular sectors 1033, 2033 of a reaction member 103, 203 of an assembly 1, 2 are in register with the assembly holes 1004, 2004 formed in each of the first extensions 1003, 2003 of one same assembly 1, 2.

The assembly device 3 therefore makes it possible to assemble each reaction member 103, 203 with its corresponding outer disk carrier 106, 206 using each of the rivets 1035, 2035 described hereinabove in this second embodiment.

It will be appreciated that, in order to assemble each reaction member 103, 203 with its corresponding outer disk carrier 106, 206, the rivet 1035, 2035 of each pair of first angular sector 1033, 2033 and first extension 1003, 2003 is pressed so as to extend radially beyond the assembly orifice 1034, 2034 and the assembly hole 1004, 2004, so as to keep the first angular sectors 1033, 2033 and first extensions 1003, 2003 of each pair firmly clamped as described hereinabove in this second embodiment.

In the assembled state, the first angular sectors 1033, 2033 and the first extensions 1003, 2003 of an assembly 1, 2 face the first angular sectors 1033, 2033 and first extensions 1003, 2003 of the other assembly 1, 2. More particularly, the assembly orifices 1034, 2034 and the assembly holes 1004, 2004 of one assembly 1, 2 are in register with the assembly orifices 1034, 2034 and with the assembly holes 1004, 2004 of the other assembly 1, 2. It will be appreciated that the rivets 1035 used to assemble the reaction member 103 with its outer disk carrier 106 of the assembly 1 formed by the first clutch 100 may face the rivets 2035 used to assemble the reaction member 203 with its outer disk carrier 206 of the other assembly 2 formed by the second clutch 200. The rivets 1035, 2035 of the corresponding assembly 1, 2 are, however, distant from the rivets 1035, 2035 of the other assembly 1, 2, this being because of the axial setting-back of the first angular sectors 1035, 2035 with respect to a bearing zone in which the first parts 103A, 203A of each assembly 1, 2 bear against one another.

According to this second embodiment of the invention, the assembly device 3 further comprises each of the rivets 1035, 2035 as described hereinabove and which contribute to the assembling of the reaction members 103, 203 with their disk carriers 106, 206. More particularly, the assembly device 3 comprises each pair of first angular sector 1033, 2033 and first extension 1003, 2003 and each rivet 1035, 2035 intended to collaborate with said pair.

As an alternative form of the invention, each of the assembly orifices 1034, 2034 of the first extensions 1003, 2003 are tapped holes configured to each accept an assembly screw.

As an alternative, the first angular sectors 1033, 2033 of each radially outer part 103A, 203A and their respective outer radial edge 103E, 203E are formed integrally in the same material. For preference, the first angular sectors 1033, 2033 of each radially outer part 103A, 203A are attached on their respective peripheral edge 1001, 2001.

It will be noted that, in this configuration, the assembly device 3, as described hereinabove in this second embodiment, does not allow the two assemblies 1, 2 to be assembled with one another, although it does contribute to performing the assembling of the two assemblies 1, 2 with one another, as described hereinafter.

In order to secure the assemblies 1, 2 rigidly to one another, the radially outer part 103A of the reaction member 103 of one assembly 1 is designed to collaborate with the radially outer part 203A of the reaction member 203 of the other assembly 2, the assembly device 3 comprising the radially outer part 103A, 203A of the reaction member of each assembly. More particularly, second angular sectors 1036, 2036 angularly distributed about the axis O and which extend radially toward the outside from the outer radial edge 103E, 203E of the corresponding reaction member 103, 203 allow the assemblies 1, 2 to be assembled with one another.

It will be appreciated that the second angular sectors 1036, 2036 are distinct from the first angular sectors 1033, 2033. Thus, the radial outer part 103A, 203A of each reaction member 103, 203 comprises both a plurality of first angular sectors 1033, 2033 and a plurality of second angular sectors 1036, 2036. According to this second embodiment, the first angular sectors 1033, 2033 of an assembly 1, 2 are angularly distributed about the axis O in alternation with the second angular sectors 1036, 2036 of the same assembly 1, 2.

It will also be appreciated that the second angular sectors 1036, 2036 of each radially outer part 103A, 203A extend radially to the outside of the cavity C1, C2 of their respective assembly 1, 2.

By way of example, each reaction member 103, 203 may comprise eight second angular sectors 1036, 2036.

As illustrated in FIGS. 3 and 4, the radially outer part 103A of the reaction member 103 of the assembly 1 that forms the first clutch 100 is designed to collaborate with the radially outer part 203A of the reaction member 203 of the assembly 2 that forms the second clutch 200. More particularly, the second angular sectors 106 of the radially outer part 103A of the reaction member 103 of the assembly 1 that forms the first clutch 100 are designed to collaborate with the second angular sectors 2036 of the radially outer part 203A of the reaction member 203 of the assembly 2 that forms the second clutch 200. It will therefore be appreciated that, in this configuration, the two assemblies 1, 2 are assembled with one another using their respective reaction member 103, 203.

It will also be noted that the second angular sectors 1036, 2036 of a reaction member 103, 203 of one assembly 1, 2 are configured to face the second angular sectors 1036, 2036 of the reaction member 103, 203 of the other assembly 1, 2. More particularly, the second angular sectors 1036, 2036 of a reaction member 103, 203 of one assembly 1, 2 are configured to bear axially against the second angular sectors 1036, 2036 of the reaction member 103, 203 of the other assembly 1, 2.

By way of example, the eight second angular sectors 1036 of the reaction member 103 of the assembly 1 that forms the first clutch 100 are configured to collaborate with the eight second angular sectors 2036 of the reaction member 203 of the assembly 2 that forms the second clutch 200.

According to this second embodiment of the invention, the assembly device 3 further comprises each pair of second angular sectors 1036, 2036 which is made up of a second angular sector 1036 of the radially outer part 103A of the reaction member 103 of the assembly 1 facing a second angular sector 2036 of the radially outer part 203A of the reaction member 203 of the other assembly 2.

Per pair of second angular sectors 1036, 2036, a rivet 1007 is intended to pass through an assembly orifice 1037, 2037 formed in a second angular sector 1036, 2036 of the radially outer part 103A, 203A of the reaction member 103, 203 of one assembly 1, 2 and to pass through an assembly orifice 1037, 2037 formed in a second angular sector 1036, 2036 of the radially outer part 103A, 203A of the reaction member 103, 203 of the other assembly 1, 2. It will be appreciated that the assembly orifices 1037, 2037 formed in each of the second angular sectors 1036, 2036 of a reaction member 103, 203 of one assembly 1, 2 are in register with the assembly orifices 1037, 2037 formed in each of the second angular sectors 1036, 2036 of a reaction member 103, 203 of the other assembly 1, 2.

The assembly device 3 thus makes it possible to assemble the assemblies 1, 2 with one another via the reaction member 103, 203 of each assembly 1, 2, using each of the rivets 1007 that perform this assembly and are described hereinabove in this second embodiment.

It will be appreciated that, in order to assemble the assemblies 1, 2 with one another, using the reaction member 103, 203 of each assembly 1, 2, the rivet 1007 of each pair of second angular sectors 1036, 2036 is pressed to extend radially beyond the assembly orifices 1037, 2037 of the corresponding pair so as to keep the second angular sectors 1036, 2036 of each pair involved in assembling the two assemblies 1, 2 clamped as described hereinabove in this second embodiment.

It will be appreciated that, in the assembled state, the second angular sectors 1036, 2036 of one assembly 1, 2 face the second angular sectors 1036, 2036 of the other assembly 1, 2. More particularly, the assembly orifices 1037, 2037 of the second angular sectors 1036, 2036 of one assembly 1, 2 are in register with the assembly orifices 1037, 2037 of the second angular sectors 1036, 2036 of the other assembly 1, 2.

According to this second embodiment of the invention, the assembly device 3 further comprises each of the rivets 1007, as described hereinabove. More particularly, the assembly device 3 comprises each pair of second angular sectors 1036, 2036 and each rivet 1007 intended to collaborate with said pair.

In this second embodiment, it will be appreciated that the outer disk carriers 106, 206 of the assemblies 1, 2 are rigidly secured to one another by their respective reaction member 103, 203.

As an alternative form of the invention, each of the assembly orifices 1037, 2037 of the second angular sectors 1036, 2036 are tapped holes configured to each accept an assembly screw.

As an alternative, the second angular sectors 1036, 2036 of each radially outer part 103A, 203A and their respective outer radial edge 103E, 203E are formed integrally in the same material. For preference, the second angular sectors 1036, 2036 of each radially outer part 103A, 203A are attached on their respective peripheral edge 1001, 2001.

According to one particular alternative form of the invention, the reaction to members 103, 203 of the assemblies 1, 2 are formed as a single piece that can be obtained by casting, for example. It will be appreciated that, in that case, the casting obtained and that forms the reaction members can be machined to size, so as to be configured dimensionally to suit the clutch mechanism 10.

Figure 5:
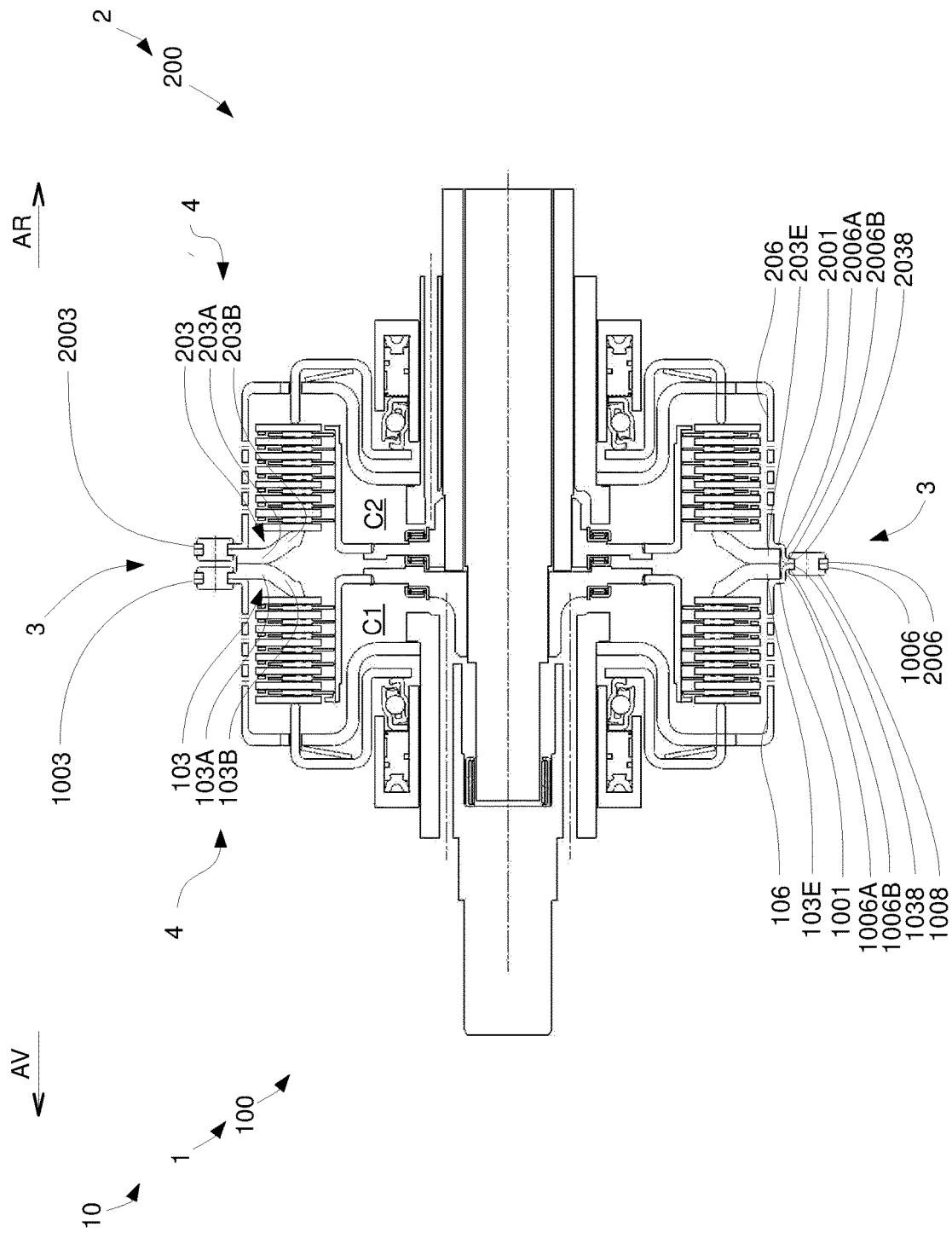
FIG. 5 illustrates a view in section of a third embodiment in which the reaction members form the adjusting device and are assembled with their corresponding disk carrier by first angular sectors in register with the first extensions of the disk carriers, and the disk carriers of the assemblies are assembled with one another by second extensions of the disk carriers.
Figure 6:
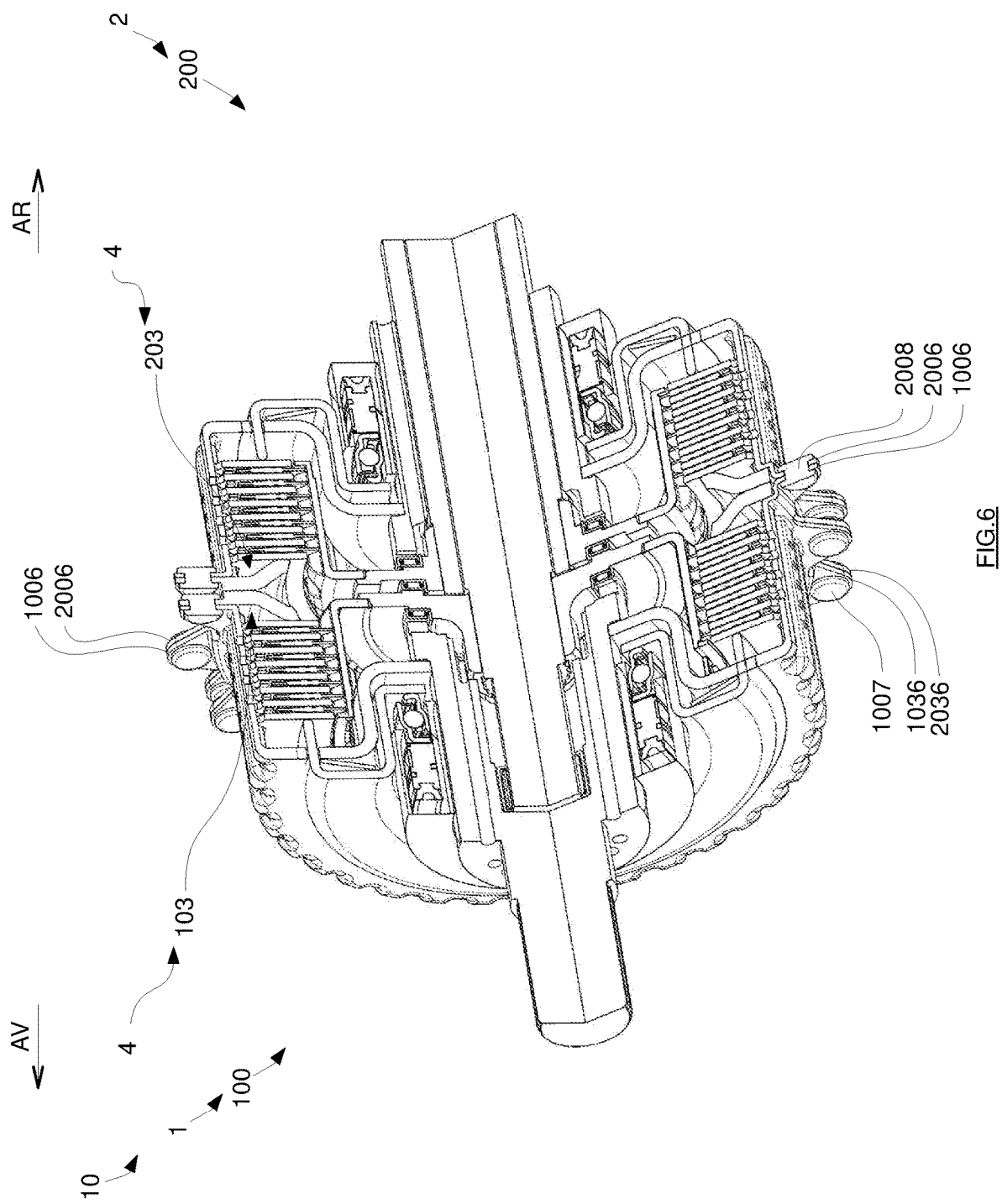
FIG. 6 illustrates a perspective view of the third embodiment of FIG. 5.

According to a third embodiment illustrated in FIGS. 5 and 6, and in the same way as in the second embodiment described previously, the reaction member 103, 203 of each assembly 1, 2 extends partially radially beyond the respective cavity C1, C2 of the outer disk carrier 106, 206 of the corresponding assembly 1, 2.

The reaction members 103, 203 of this third embodiment are similar to those in the second embodiment.

In the same way, each reaction member 103, 203 comprises a radially outer part 103A, 203A extending radially chiefly to the outside of the cavity C1, C2, namely beyond the peripheral edge 1001, 2001 of the corresponding outer disk carrier 106, 206, and a radially inner part 103B, 203B situated inside the cavity C1, C2, namely on the inside with respect to the peripheral edge 1001, 2001 of the corresponding outer disk carrier 106, 206. It will be appreciated that the first parts 103A, 203A and the second parts 103B, 203B are in an identical configuration to that of the second embodiment.

In the same way as in the second embodiment, the peripheral edges 1001, 2001 of the assemblies 1, 2 are arranged in such a way as to face one another, more particularly, the peripheral edges 1001, 2001 of the assemblies 1, 2 are symmetric with respect to one another.

The reaction members 103, 203 are rigidly secured to their respective outer disk carriers 106, 206 in the same way as in the second embodiment described above.

The adjusting device 4 is identical to the one described in the second embodiment.

It will be appreciated that the alternative forms envisaged in the second embodiment may be applied to this third embodiment.

In exactly the same way as in the second embodiment, in order to assemble the assemblies 1, 2 with one another, the radially outer part 103A of the reaction member 103 of one assembly 1 is designed to collaborate with the radially outer part 203A of the reaction member 203 of the other assembly 2. In the same way, the reaction members 103, 203 are connected to one another via their respective second angular sectors 1036, 2036.

Thus, in a similar way to the second embodiment, it will be appreciated that the outer disk carriers 106, 206 of the assemblies 1, 2 are rigidly secured to one another via their reaction member 103, 203. However, unlike in the second embodiment, in this third embodiment, the outer disk carriers 106, 206 of the assemblies 1, 2 are additionally rigidly secured to one another by direct contact with one another.

As illustrated in FIGS. 5 and 6 and in order to achieve this direct contact, the outer disk carrier 106, 206 of each assembly 1, 2 comprises second extensions 1006, 2006. The second extensions 1006, 2006 of each outer disk carrier 106, 206 extend beyond the peripheral edge 1001, 2001 of the outer disk carrier 106, 206 of the corresponding assembly 1, 2. It will be appreciated that the second extensions 1003, 2003 of the outer disk carriers 106, 206 also extend from the respective peripheral edges 1001, 2001 of the corresponding outer disk carriers 106, 206. As depicted, the respective second extensions 1006, 2006 of each outer disk carrier 106, 206 are angularly distributed around the peripheral edge 1001, 2001 of the corresponding outer disk carrier 106, 206. It will be appreciated that the respective second extensions 1006, 2006 of each outer disk carrier 106, 206 are uniformly angularly distributed about the axis O.

Each second extension 1006, 2006 comprises a first portion 1006A, 2006A and a second portion 1006B, 2006B which are designed with a view to assembling the assemblies 1, 2 to one another. It will be noted that the second portion 1006B, 2006B of each second extension 1006, 2006 follows on from the first portion 1006A, 2006A of the same second extension 1006, 2006. In other words, the first portion 1006A, 2006A and the second portion 1006B, 2006B of the one same second extension 1006, 2006 share a same edge. As depicted, the first portion 1006A, 2006A of each second extension 1006B, 2006B of one assembly 1, 2 extends axially, from the peripheral edge 1001, 2001, in the direction of a first portion 1006A, 2006A of a second extension 1006B, 2006B of the other assembly 1, 2. Furthermore, the radially outer part 103A, 203A of the reaction member 103, 203 of each assembly 1, 2 bears radially by its outer radial edge 103E, 203E against each of the first portions 1006A, 2006A of the second extensions 1006, 2006 of the outer disk carrier 106, 206 of the same assembly 1, 2. The second portion 1006B, 2006B of each second extension 1006, 2006 extends radially outward from the first portion 1006A, 2006A of the same second extension 1006, 2006.

It will be appreciated that the second extensions 1006, 2006 are distinct from the first extensions 1003, 2003. Thus, the peripheral edge 1001, 2001 of the outer disk carrier 106, 206 of each assembly 1, 2 comprises both a plurality of first extensions 1003, 2003 and a plurality of second extensions 1006, 2006. According to this third embodiment, the first extensions 1003, 2003 of one assembly 1, 2 are angularly distributed about the axis O in alternation with the second extensions 1006, 2006 of the same assembly 1, 2.

It will also be appreciated that the second extensions 1006, 2006 of each disk carrier 106, 206 extend radially to the outside of the cavity C1, C2 of their respective assembly 1, 2.

As illustrated in FIG. 5 or 6, the outer disk carrier 106 of the assembly 1 that forms the first clutch 100 is designed to collaborate with the outer disk carrier 206 of the assembly 2 that forms the second clutch 200. More particularly, the second extensions 1006 of the outer disk carrier 106 of the assembly 1 that forms the first clutch 100 are designed to collaborate with the second extensions 2006 of the outer disk carrier 206 of the assembly 2 that forms the second clutch 200. It will therefore be appreciated that, in this configuration, the two assemblies 1, 2 are assembled with one another both via their respective reaction member 103, 203 and via their respective outer disk carrier 106, 206.

It will also be noted that the second portions 1006B, 2006B of the second extensions 1006, 2006 of an outer disk carrier 106, 206 of one assembly 1, 2 are configured in such a way as to face the second portions 1006B, 2006B of the second extensions 1006, 2006 of the outer disk carrier 106, 206 of the other assembly 1, 2. More particularly, the second portions 1006B, 2006B of the second extensions 1036, 2036 of an outer disk carrier 106, 206 of one assembly 1, 2 are configured to bear axially against the second portions 1006B, 2006B of the second extensions 1006, 2006 of the outer disk carrier 106, 206 of the other assembly 1, 2.

By way of example, eight second extensions 1006 of the outer disk carrier 106 of the assembly 1 that forms the first clutch 100 may be configured to collaborate, via their second portions 1006B, with eight second extensions 2006 of the outer disk carrier 206 of the assembly 2 that forms the second clutch 200, via their second portions 2006B.

According to this third embodiment of the invention, the assembly device 3 further comprises each pair of second extensions 1006, 2006 made up of a second extension 1006 of the outer disk carrier 106 of the assembly 1 that forms the first clutch 100 facing a second extension 2006 of the outer disk carrier 206 of the assembly 2 that forms the second clutch 200.

Per pair of second extensions 1006, 2006 a rivet 1008 is intended to pass through an assembly orifice 1038, 2038 formed in a second portion 1006B, 2006B of a second extension 1006, 2006 of the outer disk carrier 106, 206 of one assembly 1, 2 and to pass through an assembly orifice 1038, 2038 formed in a second portion 1006B, 2006B of a second extension 1006, 2006 of the outer disk carrier 106, 206 of the other assembly 1, 2. It will be appreciated that the assembly orifices 1038, 2038 formed in the second portions 1006B, 2006B of the second extensions 1006, 2006 of the outer disk carrier 106, 206 of one assembly 1, 2 are in register with the assembly orifices 1038, 203 formed in the second portions 1006B, 2006B of the second extensions 1006, 2006 of the outer disk carrier 106, 206 of the other assembly 1, 2.

The assembly device 3 therefore makes it possible to supplement the assembling of the assemblies 1, 2 with one another via the outer disk carrier 106, 206 of each assembly 1, 2 using each of the rivets 1008 that perform this configuration of assembly and are described hereinabove in this third embodiment.

It will be appreciated that, in the assembled state, the second extensions 1006, 2006 of one assembly 1, 2 face the second extensions 1006, 2006 of the other assembly 1, 2. More specifically, the assembly orifices 1038, 2038 of the second portions 1006B, 2006B of the second extensions 1006, 2006 of one assembly 1, 2 are in register with the assembly orifices 1038, 2038 of the second extensions 1006, 2006 of the other assembly 1, 2.

According to this third embodiment of the invention, the assembly device 3 further comprises each of the rivets 1008, as described hereinabove and that contribute to assembling the outer disk carriers 106, 206 with one another. More particularly, the assembly device 3 comprises each pair of second extensions 1006, 2006 and each rivet 1008 intended to collaborate with said pair.

In this third embodiment, it will be appreciated that the assemblies 1, 2 are rigidly secured to one another via their respective reaction member 103, 203 and via their respective outer disk carrier 106, 206.

As an alternative form of the invention, each of the assembly orifices 1038, 2038 of the second portions 1006B, 2006B of the second extensions 1006, 2006 are tapped holes configured to each accept an assembly screw.

As an alternative, the second extensions 1006, 2006 of each outer disk carrier 106, 206 and their respective outer radial edge 103E, 203E are formed integrally in the same material. For preference, the second extensions 1006, 2006 of each outer disk carrier 106, 206 are attached on their respective peripheral edge 1001, 2001.

According to a fourth embodiment illustrated in FIG. 7, and in the same way as in the second and third embodiments described previously, the reaction member 103, 203 of each assembly 1, 2 extends partially radially beyond the respective cavity C1, C2 of the outer disk carrier 106, 206 of the corresponding assembly 1, 2.

The reaction members 103, 203 of this fourth embodiment are similar to those in the second and third embodiments.

In the same way, each reaction member 103, 203 comprises a radially outer part 103A, 203A extending radially chiefly to the outside of the cavity C1, C2, namely beyond the peripheral edge 1001, 2001 of the corresponding outer disk carrier 106, 206, and a radially inner part 103B, 203B situated inside the cavity C1, C2, namely on the inside with respect to the peripheral edge 1001, 2001 of the corresponding outer disk carrier 106, 206. It will be appreciated that the first parts 103A, 203A and the second parts 103B, 203B are in an identical configuration to that of the second and third embodiments.

The adjusting device 4 is identical to the one described in the second embodiment.

In the same way as in the second and third embodiments, the peripheral edges 1001, 2001 of the assemblies 1, 2 are arranged in such a way as to face one another, more particularly, the peripheral edges 1001, 2001 of the assemblies 1, 2 are symmetric with respect to one another.

The reaction members 103, 203 are rigidly secured to their respective outer disk carriers 106, 206 in the same way as in the second and third embodiments described above.

Likewise it will be appreciated that the alternative forms envisaged in the second embodiment may be applied to this fourth embodiment.

In exactly the same way as in the second and third embodiments, in order to assemble the assemblies 1, 2 with one another, the radially outer part 103A of the reaction member 103 of one assembly 1 is designed to collaborate with the radially outer part 203A of the reaction member 203 of the other assembly 2. In the same way, the reaction members 103, 203 are connected to one another via their respective second angular sectors.

Thus, in a similar way to the second and third embodiments, it will be appreciated that the outer disk carriers 106, 206 of the assemblies 1, 2 are rigidly secured to one another via their reaction member 103, 203. However, unlike in the third embodiment, in this fourth embodiment, an outer disk carrier 106, 206 of one assembly 1, 2 is additionally rigidly secured by direct contact to the reaction member 103, 203 of the other assembly 1, 2.

In order to secure an outer disk carrier 106, 206 of one assembly 1, 2 rigidly to a reaction member 103, 203 of the other assembly 1, 2, the outer disk carrier 106, 206 of one assembly 1, 2 comprises second extensions 1006, 2006 as described in the third embodiment detailed hereinabove and intended to collaborate with other second angular sectors 1036, 2036 of the reaction member 103, 203 of the other assembly 1, 2, as described in the third embodiment detailed hereinabove.

It will also be appreciated that the second angular sectors 1036, 2036 of a reaction member 103, 203 of one assembly 1, 2, which are intended to collaborate with the second extensions 1006, 2006 of the disk carrier 106, 206 of the other assembly 1, 2 are distinct from the second angular sectors 1036, 2036 of a reaction member 103, 203 of one assembly 1, 2 which are intended to collaborate with the second angular sectors 1036, 2036 of a reaction member 103, 203 of the other assembly 1, 2.

As illustrated in FIG. 7, the reaction member 103 of the assembly 1 that forms the first clutch 100 is designed to collaborate with the outer disk carrier 206 of the assembly 2 that forms the second clutch 200. More particularly, second angular sectors 1036 of the reaction member 103 of the assembly 1 that forms the first clutch 100 are designed to collaborate with second extensions 2006 of the outer disk carrier 106 of the assembly 2 that forms the second clutch 200. It will therefore be appreciated that, in this configuration, the two assemblies 1, 2 are assembled with one another both via their respective reaction member 103, 203 and via an outer disk carrier 106 of one assembly 1 collaborating with the reaction member 203 of the other assembly 2.

It will also be noted that the second portions 1006B, 2006B of the second extensions 1006, 2006 of an outer disk carrier 106, 206 of one assembly 1, 2, that provide assembly with the reaction member 103, 203 of the other assembly 1, 2, are configured to face the second angular sectors 1036, 2036 of the reaction member 103, 203 of the other assembly 1, 2 providing this very assembly. More specifically, these second portions 1006B, 2006B of these second extensions 1036, 2036 are configured to bear axially against these second angular sectors 1036, 2036.

By way of example, eight second angular sectors 1036 of the reaction member 103 of the assembly 1 that forms the first clutch 100 may be configured to collaborate with eight second extensions 2006 of the outer disk carrier 206 of the assembly 2 that forms the second clutch 200, via their second portions 2006B.

According to this fourth embodiment of the invention, the assembly device 3 further comprises each pair of second angular sector 1036, 2036 of one assembly 1, 2 and second extension 1006, 2006 of the other assembly 1, 2, this pair consisting of a second angular sector 1036 of the reaction member 103 of an assembly 1 that forms the first clutch 100 facing a second extension 2006 of the outer disk carrier 206 of the assembly 2 that forms the second clutch 200.

Per pair of second angular sector 1036, 2036 of one assembly 1, 2 and second extension 1006, 2006 of the other assembly 1, 2, a rivet 1009 is intended to pass through an assembly orifice 1037, 2037 formed in a second angular sector 1036, 2036 of the radially outer part 103A, 203A of the reaction member 103, 203 of one assembly 1, 2, and to pass through an assembly orifice 1038, 2038 formed in a second portion 1006B, 2006B of a second extension 1006, 2006 of the outer disk carrier 106, 206 of the other assembly 1, 2. In these pairs, as described in this fourth embodiment, it will be appreciated that the assembly orifices 1037, 2037 formed in the second angular sectors 1036, 2036 of the radially outer part 103A, 203A of the reaction member 103, 203 of one assembly 1, 2 are in register with the assembly orifices 1038, 203 formed in the second portions 1006B, 2006B of the second extensions 1006, 2006 of the outer disk carrier 106, 206 of the other assembly 1, 2.

The assembly device 3 therefore makes it possible to supplement the assembling of the assemblies 1, 2 with one another via the outer disk carrier 106, 206 of one assembly 1, 2 and the reaction member 103, 203 of the other assembly 1, 2, using each of the rivets 1009 that provide for this configuration of assembly and that are described hereinabove in this fourth embodiment.

In the assembled state, the second angular sectors 1036, 2036 of one assembly 1, 2 face the second extensions 1006, 2006 of the other assembly 1, 2. More particularly, the assembly orifices 1037, 2037 of the second angular sectors 1036, 2036 of one assembly 1, 2 are in register with the assembly orifices 1038, 2038 of the second extensions 1006, 2006 of the other assembly 1, 2.

According to this fourth embodiment of the invention, the assembly device 3 further comprises each of the rivets 1009, as described hereinabove and that contribute to the assembling of an outer disk carrier 106, 206 of one assembly 1, 2 to the reaction member 103, 203 of the other assembly 1, 2. More particularly, the assembly device 3 comprises each pair of second angular sector 1036, 2036 of one assembly 1, 2 and second extension 1006, 2006 of the other assembly 1, 2 and each rivet 1009 intended to collaborate with said pair.

In this fourth embodiment, it will be appreciated that the assemblies 1, 2 are rigidly secured to one another via their respective reaction member 103, 203 and via an outer disk carrier 106, 206 of one assembly 1, 2 collaborating with the reaction member 103, 203 of the other assembly 1, 2.

In an alternative form of the invention, each of the assembly orifices 1037, 2037 of the second angular sectors 1036, 2036 of one assembly 1, 2 and each of the assembly orifices 1038, 2038 of the second portions 1006B, 2006B of the second extensions 1006, 2006 which are configured to collaborate with one another are tapped holes configured to each accept an assembly screw.

According to one particular alternative form of this fourth embodiment, described in FIG. 8, the outer disk carrier 106, 206 of each assembly 1, 2 is rigidly secured to a reaction member 103, 203 of the other assembly 1, 2. For that, the outer disk carrier 106, 206 of each assembly 1, 2 comprises other second extensions 1006, 2006, as described in the third embodiment detailed hereinabove, and intended to collaborate with other second angular sectors 1036, 2036 of the reaction member 103, 203 of the other assembly 1, 2, as described in the third embodiment detailed hereinabove.

It will be appreciated that the second extensions 1006, 2006 of a disk carrier 106, 206 of each assembly 1, 2, which are intended to collaborate with the second angular sectors 1036, 2036 of the reaction member 103, 203 of the other assembly 1, 2 are distinct from the second extensions 1006, 2006 of a disk carrier 106, 206 of an assembly 1, 2 which are intended to collaborate with the second extensions 1006, 2006 of the disk carrier 106, 206 of the other assembly 1, 2.

It will also be appreciated that the second angular sectors 1036, 2036 of each reaction member 103, 203 of one assembly 1, 2 which are intended to collaborate with the second extensions 1006, 2006 of the disk carrier 106, 206 of the other assembly 1, 2 are distinct from the second angular sectors 1036, 2036 of a reaction member 103, 203 of an assembly 1, 2 which are intended to collaborate with the second angular sectors 1036, 2036 of a reaction member 103, 203 of the other assembly 1, 2.

As illustrated in FIG. 8, the reaction member 103 of the assembly 1 that forms the first clutch 100 is designed to collaborate with the outer disk carrier 206 of the assembly 2 that forms the second clutch 200, and the reaction member 203 of the assembly 2 that forms the second clutch 200 is designed to collaborate with the outer disk carrier 106 of the assembly 1 that forms the first clutch 100. More particularly, second angular sectors 1036 of the reaction member 103 of the assembly 1 that forms the first clutch 100 are designed to collaborate with second extensions 2006 of the outer disk carrier 206 of the assembly 2 that forms the second clutch 200 and, in alternation, second angular sectors 2036 of the reaction member 203 of the assembly 2 that forms the second clutch 200 are designed to collaborate with second extensions 1006 of the outer disk carrier 106 of the assembly 1 that forms the first clutch 100. It will therefore be appreciated that, in this configuration, the two assemblies 1, 2 are assembled with one another both via their respective reaction member 103, 203 and via the outer disk carrier 106, 206 of each assembly 1, 2 collaborating with the reaction member 103, 203 of the other assembly 1, 2.

What is meant by "alternation" is that a pair of second angular sector 1036 of the assembly 1 that forms the first clutch 100 and second extension 2006 of the other assembly 2 that forms the second clutch 200 is positioned angularly about the axis O in alternation with a pair of second angular sector 2036 of the assembly 2 that forms the second clutch 200 and second extension 1006 of the other assembly 1 that forms the first clutch 100.

According to a fifth embodiment illustrated in FIG. 9, and in the same way as in the second to fourth embodiments described previously, the reaction member 103, 203 of each assembly 1, 2 extends partially radially beyond the respective cavity C1, C2 of the outer disk carrier 106, 206 of the corresponding assembly 1, 2.

The reaction members 103, 203 of this fifth embodiment are similar to those in the second to fourth embodiments.

In the same way, each reaction member 103, 203 comprises a radially outer part 103A, 203A extending radially chiefly to the outside of the cavity C1, C2, namely beyond the peripheral edge 1001, 2001 of the corresponding outer disk carrier 106, 206, and a radially inner part 103B, 203B situated inside the cavity C1, C2, namely on the inside with respect to the peripheral edge 1001, 2001 of the corresponding outer disk carrier 106, 206. It will be appreciated that the first parts 103A, 203A and the second parts 103B, 203B are in an identical configuration to that of the second and third embodiments.

The adjusting device 4 is identical to that described in the second embodiment.

In the same way as in the second to fourth embodiments, the peripheral edges 1001, 2001 of the assemblies 1, 2 are arranged in such a way as to face one another, more particularly, the peripheral edges 1001, 2001 of the assemblies 1, 2 are symmetric with respect to one another.

The reaction members 103, 203 are rigidly secured to their respective outer disk carriers 106, 206 in a similar way as in the second to fourth embodiments described above.

In the same way, it will be appreciated that the alternative forms envisaged in the second embodiment may be applied to this fifth embodiment.

Thus, in exactly the same way as in the second to fourth embodiments, in order to assemble the assemblies 1, 2 with one another, the radially outer part 103A of the reaction member 103 of one assembly 1 is designed to collaborate with the radially outer part 203A of the reaction number 203 of the other assembly 2. In the same way, the reaction members 103, 203 are connected to one another via their respective second angular sectors.

Thus, in a similar way to the second to fourth embodiments, it will be appreciated that the outer disk carriers 106, 206 of the assemblies 1, 2 are rigidly secured to one another via their reaction member 103, 203. As described in detail in the second embodiment, the first angular sectors 1033, 2033 and the first extensions 1003, 2003 of one assembly 1, 2 face the first angular sectors 1033, 2033 and the first extensions 1003, 2003 of the other assembly 1, 2. Thus, each pair of first angular sector 1033, 2033 and first extension 1003, 2003 of one same assembly 1, 2 is configured to be positioned facing a pair of first angular sector 1033, 2033 and first extension 1003, 2003 of the other assembly 1, 2.

However, in comparison with the embodiments described hereinabove, in this fifth embodiment, in alternation with the configuration of the first extensions 1003, 2003 detailed in the second embodiment, a pair of first angular sector 1033, 2033 and first extension 1003, 2003 of one assembly 1, 2 and a pair of first angular sector 1033, 2033 and first extension 1003, 2003 of the other assembly 1, 2 are configured to receive the one same rivet 1010. Thus, the one same rivet 1010 is intended to pass, in the one same assembly 1, 2, through an assembly orifice 1034, 2034 formed in a first angular sector 1033, 2033 of the radial outer part 103A, 203A of the reaction member 103, 203 and through an assembly hole 1004, 2004 formed in a first extension 1003, 2003 of the outer disk carrier 106, 206 and then, in the other assembly 1, 2 to pass through an assembly orifice 1034, 2034 formed in a first angular sector 1033, 2033 of the radially outer part 103A, 203A of the reaction member 103, 203 and an assembly hole 1004, 2004 formed in a first extension 1003, 2003 of the outer disk carrier 106, 206.

In this configuration, the rivet 1010 allows the disk carrier 106, 206 and the reaction members 103, 203 of each assembly 1, 2 to be rigidly secured by direct contact.

It will be appreciated that, to ensure correct assembly of the assemblies 1, 2 with one another, each rivet 1010 described in this fifth embodiment is pressed so that it extends radially beyond the assembly holes 1004, 2004 so as to keep the first angular sectors 1033, 2033 and first extensions 1003, 2003 of each pair firmly clamped, as described hereinabove in this second embodiment. It will also be noted that the rivets 1010 comprise a shoulder at their middle, configured and sized to come to bear axially against the first angular sectors 1033, 2033 of the one same pair as described in this fifth embodiment.

In general in the embodiments it will be appreciated that the pairs of first and/or second extensions described and/or the first and/or second angular sectors described are distributed so that they alternate angularly about the axis O.

It will be noted that the first embodiment may advantageously be combined with any one of the second, third, fourth or fifth embodiments.

Of course the invention is not restricted to the examples which have just been described, and numerous modifications may be made to these examples without departing from the scope of the invention. In particular, the various features, shapes, alternative forms and embodiments of the invention may be brought together in various combinations insofar as they are not incompatible or mutually exclusive.

The invention claimed is:

1. A clutch mechanism configured to be driven in rotation about an axis, comprising:
   two assemblies, each assembly comprising:
      an outer disk carrier delimiting on the outside a cavity,
      a clutch comprising a stack of coupling disks and of friction disks, the stack being housed in the cavity and configured to be driven in rotation about the axis, and
      a reaction member of the outer disk carrier configured to allow the coupling disks to be compressed against the friction disks in an engaged position of the clutch;
   an assembly device for assembling the two assemblies with one another; and
   an adjusting device for setting an axial distance separating the two clutches,
   wherein each of the outer disk carriers of the assemblies comprises a first extension extending radially outward beyond a peripheral edge of the corresponding outer disk carrier, the adjusting device being positioned between the two first extensions,
   wherein the adjusting device is formed by a spacer the shape of which is circular with respect to the axis, and
   wherein the spacer keeps at least one of the reaction members bearing against the corresponding clutch.

2. The clutch mechanism as claimed in claim 1, wherein the adjusting device makes it possible to set an internal axial clearance for each clutch.

3. The clutch mechanism as claimed in claim 1, wherein the adjusting device is positioned between the two outer disk carriers.

4. The clutch mechanism as claimed in claim 1, wherein the spacer comprises a radial projection with respect to the axis providing bearing pressure against at least the first extension of each of the outer disk carriers.

5. The clutch mechanism as claimed in claim 1, wherein the spacer comprises a first axial projection providing bearing pressure against one of the reaction members.

6. The clutch mechanism as claimed in claim 5, wherein the spacer comprises a second axial projection providing bearing pressure against the other reaction member, the first axial projection being distinct from the second axial projection.

7. The clutch mechanism as claimed in claim 1, wherein the adjusting device is formed by at least one reaction member of the assemblies.

8. The clutch mechanism as claimed in claim 1, wherein the adjusting device comprises a radially outer part of the reaction member extending radially chiefly to the outside of the cavity, namely beyond the peripheral edge of the corresponding outer disk carrier.

9. The clutch mechanism as claimed in claim 8, wherein at least the radially outer part of the reaction member allows the setting of the axial distance separating the two clutches.

10. The clutch mechanism as claimed in claim 8, wherein a thickness, measured axially, of the radially outer part of the reaction member determines the axial distance separating the two clutches.

11. The clutch mechanism as claimed in claim 1, wherein the adjusting device comprises a radially inner part of the reaction member, which part is situated inside the cavity, namely on the inside with respect to the peripheral edge of the corresponding outer disk carrier.

12. The clutch mechanism as claimed in claim 11, wherein an inner radial edge of the radially inner part of the reaction member bearing against the corresponding clutch is axially offset with respect to an outer radial edge of a radially outer part of the same reaction member bearing against the corresponding outer disk carrier.

13. The clutch mechanism as claimed in claim 12, wherein a width of the radially inner part of the reaction member, measured axially between the inner radial edge bearing against the corresponding clutch and the outer radial edge bearing against the corresponding outer disk carrier, determines an internal axial clearance for the corresponding clutch.

14. The clutch mechanism as claimed in claim 8, wherein the radially outer part of the reaction member of the corresponding assembly bears against a radially outer part of the reaction member of the other assembly.

15. A method for assembling the clutch mechanism as claimed in claim 1, comprising:
   a first placement step, positioning the assemblies relative to one another in such a way that one of the outer disk carriers faces the other outer disk carrier;
   a second placement step, positioning the adjusting device between the two assemblies; and
   an assembly step, fixing the assemblies to one another with the adjusting device and using the assembly device.

16. The clutch mechanism as claimed in claim 1,
   wherein the outer disk carrier of each of the assemblies comprises an axial elongation land directed toward the clutch of the respective other assembly, the axial elongation land delimits radially toward an outside the cavity, and
   wherein axial dimensions of each of the axial elongation lands are identical.

17. A clutch mechanism configured to be driven in rotation about an axis, comprising:
   two assemblies, each assembly comprising:
      an outer disk carrier delimiting on the outside a cavity,
      a clutch comprising a stack of coupling disks and of friction disks, the stack being housed in the cavity and configured to be driven in rotation about the axis, and
      a reaction member of the outer disk carrier configured to allow the coupling disks to be compressed against the friction disks in an engaged position of the clutch;
   an assembly device for assembling the two assemblies with one another; and
   an adjusting device for setting an axial distance separating the two clutches,
   wherein the adjusting device is formed by a spacer positioned between the two outer disk carriers,
   wherein the spacer comprises a first axial projection providing bearing pressure against one of the two reaction members,
   wherein the spacer comprises a second axial projection providing bearing pressure against the other of the two reaction members, and
   wherein the first axial projection and the second axial projection having different axial dimensions.

18. A clutch mechanism configured to be driven in rotation about an axis, comprising:
   two assemblies, each assembly comprising:
      an outer disk carrier delimiting on the outside a cavity,
      a clutch comprising a stack of coupling disks and of friction disks, the stack being housed in the cavity and configured to be driven in rotation about the axis, and a reaction member of the outer disk carrier configured to allow the coupling disks to be compressed against the friction disks in an engaged position of the clutch;

an assembly device for assembling the two assemblies with one another; and an adjusting device for setting an axial distance separating the two clutches, wherein each of the outer disk carriers of the assemblies comprises a first extension extending radially outward beyond a peripheral edge of the corresponding outer disk carrier, the adjusting device being positioned between the two first extensions, and wherein the adjusting device is formed by at least one reaction member of the assemblies.

* * * * *